(12) United States Patent
Okubo et al.

(10) Patent No.: US 7,212,912 B2
(45) Date of Patent: May 1, 2007

(54) INTERNAL CYLINDER PRESSURE DETECTION

(75) Inventors: Katsura Okubo, Saitama (JP); Yuji Yasui, Saitama (JP); Masahiro Sato, Saitama (JP); Koichiro Shinozaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/268,718

(22) Filed: Nov. 8, 2005

(65) Prior Publication Data

US 2006/0142930 A1 Jun. 29, 2006

(30) Foreign Application Priority Data

Dec. 27, 2004 (JP) ............... 2004-377156

(51) Int. Cl.
  *G01M 15/00* (2006.01)
  *F02D 45/00* (2006.01)
(52) U.S. Cl. ............ 701/114; 73/35.12; 701/111
(58) Field of Classification Search ............. 701/114, 701/110, 111, 102; 123/488, 435; 73/35.12, 73/35.08, 117.3, 118.2
See application file for complete search history.

(56) References Cited

U.S. PATENT DOCUMENTS

| | | | | |
|---|---|---|---|---|
| 4,010,717 A | * | 3/1977 | Taplin | 701/103 |
| 4,387,588 A | | 6/1983 | Kaji | |
| 4,711,212 A | * | 12/1987 | Haraguchi et al. | 123/406.38 |
| 4,821,194 A | | 4/1989 | Kawamura | |
| 5,206,809 A | * | 4/1993 | Iwakiri et al. | 701/111 |
| 5,996,398 A | | 12/1999 | Schleupen et al. | |
| 6,915,788 B2 | * | 7/2005 | Nakamura | 123/488 |

FOREIGN PATENT DOCUMENTS

EP 1 045 226 A1 10/2000
JP 07-280686 A 10/1995

\* cited by examiner

*Primary Examiner*—Hieu T. Vo
(74) *Attorney, Agent, or Firm*—Arent Fox PLLC

(57) ABSTRACT

An in-cylinder pressure sensor outputs a signal corresponding to a change rate of an internal cylinder pressure of an engine. The output signal of the in-cylinder pressure sensor is filtered so that frequency components lower than frequencies that substantially compose an internal cylinder pressure required for controlling the engine are cut. The filtered output signal is integrated to determine the internal cylinder pressure. Thus, an internal cylinder pressure having no drift can be determined.

20 Claims, 25 Drawing Sheets

(a)

Calculation Section A

Crank Angle (b)

Frequency (a)

| Fourier Coefficients (DC component, cos components) | Value | Fourier Coefficients (sin components) | Value |
|---|---|---|---|
| a0 (DC component) | 1.974e-017 | | |
| a1 | -0.06387 | b1 | 4.356 |
| a2 | -0.0187 | b2 | 0.707 |
| a3 | 0.0007413 | b3 | 0.004717 |
| a4 | -2.195e-005 | b4 | -0.002233 |

(a)

(b)

INTERNAL CYLINDER PRESSURE DETECTION

BACKGROUND OF THE INVENTION

The present invention relates to an apparatus and method for detecting an in-cylinder pressure of an internal-combustion engine, and in particular to an apparatus and method for detecting a more accurate in-cylinder pressure by removing a drift from the in-cylinder pressure.

Conventionally, an in-pressure sensor is disposed in a cylinder of an engine to detect a pressure within the cylinder (referred to as an "in-cylinder pressure"). The in-cylinder pressure detected by such a sensor is used for controlling the engine.

An in-cylinder pressure sensor using a piezo-electric element is known. The piezo-electric sensor detects a change rate of the in-cylinder pressure. As shown in FIG. 25, the change rate detected by the in-cylinder pressure sensor 200 is typically integrated by an integration circuit 201. An output of the integration circuit 201 is used as an in-cylinder pressure.

In general, when a piezo-electric element is used, there is hysteresis between a change of the in-cylinder pressure and the output of the in-cylinder pressure sensor. The output of the in-cylinder pressure sensor increases with an increase in the temperature of the piezo-electric element. When such an in-cylinder pressure sensor is mounted on an engine, variations occur in the output of the in-cylinder sensor due to the heat from the engine. As a result, "deviation" or a drift as shown in FIG. 26 may appear in the waveform of the in-cylinder pressure obtained from the integration circuit.

If a drift occurs, it is difficult to detect a correct in-cylinder pressure. The output of the in-cylinder pressure sensor is typically converted from analog to digital (A/D conversion) for subsequent computer processes. If a drift component is contained in the output of the in-cylinder pressure sensor, correlation may be lost between an analog value that is an output of the in-cylinder pressure sensor and a digital value that is an output after the A/D conversion.

Japanese Patent Application Publication H07-280686 discloses a technique for correcting a drift by resetting the integration circuit. Referring to FIG. 27, a switching element 212 is closed at a predetermined timing in each combustion cycle of an engine. When the switching element is in a closed state, no voltage potential difference exists across a capacitor 213 and hence the output of an operational amplifier 214 is reset to a reference value. A drift is removed in response to the reset operation.

FIG. 28 shows a waveform of the in-cylinder pressure obtained from the integration circuit when the above reset operation is performed. The reset operation is carried out at time t1, t2, t3, t4 and t5. It is seen that a waveform 115, which is caused by the reset operation, is superimposed on the waveform of the in-cylinder pressure. In response to the reset operation, frequency discontinuities appear in the in-cylinder pressure waveform. Due to such frequency discontinuities, an undesired frequency component is introduced into subsequent computer processes, which reduces the accuracy in controlling the engine. Even if such reset operation is performed, a drift may increase during one combustion cycle (that is, between the reset operation at one time and the reset operation at another time).

Thus, there is a need for a technique for removing a drift to detect an in-cylinder pressure without performing such reset operation.

SUMMARY OF THE INVENTION

According to one aspect of the present invention, an in-cylinder pressure sensor outputs a signal corresponding to a change rate of the internal cylinder pressure of an engine. The output signal of the in-cylinder pressure sensor is filtered so that frequency components lower than frequencies that substantially compose an internal cylinder pressure required for controlling the engine are cut. The filtered output signal is integrated to determine the internal cylinder pressure. Preferably, the filtering is performed to cut frequency components composing a drift as well as being lower than frequencies that substantially compose an internal cylinder pressure required for controlling the engine.

It has been recognized by the inventors that the frequency band of a drift is lower than the frequency band of the internal cylinder pressure required for an engine control. The present invention is based on the recognition. According to this invention, filtering removes from the output signal of the in-cylinder pressure sensor low-frequency components composing a drift. Therefore, by integrating the filtered output signal, the internal cylinder pressure in which a drift has been removed can be determined. Further, according to this invention, because a drift is removed without resetting operation, discontinuities can be prevented from appearing in the internal cylinder pressure.

According to one embodiment of the present invention, a cut-off frequency for the filtering is changed in accordance with a detected rotational speed of the engine. Because a cut-off frequency that is most appropriate for the current engine rotational speed is established, it can be prevented that low-frequency components composing a drift are not completely cut.

According to another embodiment of the present invention, the output signal of the in-cylinder pressure sensor is sampled in synchronization with the engine rotation. The sampled output signal is filtered. Because the output signal of the in-cylinder pressure sensor is sampled in synchronization with the engine rotation, the filtering can be performed with a cut-off frequency corresponding to the engine rotational speed. There is no need to change the filter characteristics.

The internal cylinder pressure signal obtained by the integration may have an offset from a predetermined value. According to one embodiment of the present invention, an offset component is removed from the internal cylinder pressure signal. The internal cylinder pressure can be more accurately determined by removing such an offset.

According to one embodiment of the present invention, the internal cylinder pressure signal calculated by the integration is sampled as an offset at a first sampling period. The offset is over-sampled at a second sampling period shorter than the first sampling period. A moving average value of the over-sampled offsets is calculated. An offset component of the internal cylinder pressure signal is removed by subtracting the moving average value from the internal cylinder pressure signal calculated by the integration. Thus, the offset is gradually removed by the moving average operation performed at a shorter interval, and hence the internal cylinder pressure signal can be continuously determined.

According to one embodiment of the present invention, the internal cylinder pressure signal calculated by the integration is sampled as an offset at a first sampling period. A reference value is subtracted from the offset to determine an absolute offset value. The absolute offset value is over-sampled at a second sampling period shorter than the first sampling period. A moving average value of the over-sampled absolute offset values is calculated. An offset component of the internal cylinder pressure signal is removed by subtracting the moving average value from the internal cylinder pressure signal calculated by the integration. Thus, because the absolute value of the offset is calculated, a more accurate offset can be determined. By gradually removing the offset value through the moving average operation, the internal cylinder pressure signal can be continuously obtained. According to one embodiment of the invention, the reference value is a pressure of an intake manifold in the intake stroke of the engine combustion cycle.

According to another embodiment of the present invention, the internal cylinder pressure signal calculated by the integration is corrected with a correction term. The correction term is determined based on the corrected internal cylinder pressure and then is fed back. The correction term is calculated by sampling as an offset the corrected internal cylinder pressure signal at a first sampling period, over-sampling the offset at a second sampling period shorter than the first sampling period, moving-averaging the over-sampled offsets, and calculating the correction term for causing the moving average value to converge to a desired value. Thus, because the correction term causes the offset to converge to a desired value, the internal cylinder pressure signal can be determined without discontinuities.

According to one embodiment of the present invention, the internal cylinder pressure signal calculated by the integration is corrected with a correction term. The correction term is calculated based on the corrected internal cylinder pressure and then is fed back. The correction term is calculated by sampling as an offset the corrected internal cylinder pressure signal at a first sampling period, subtracting a reference value from the offset to determine an absolute offset value, over-sampling the absolute offset value at a second sampling period shorter than the first sampling period, moving-averaging the over-sampled absolute offset values, and calculating the correction term for causing the moving average value to converge to a desired value. Thus, because the absolute value of the offset is calculated, a more accurate offset can be determined. Because the correction term causes the absolute offset to converge to a desired value, the internal cylinder pressure signal can be continuously determined. According to one embodiment of the invention, the reference value is a pressure of an intake manifold in the intake stroke of the engine combustion cycle.

DESCRIPTION OF THE PREFERRED EMBODIMENTS

Figure 1:
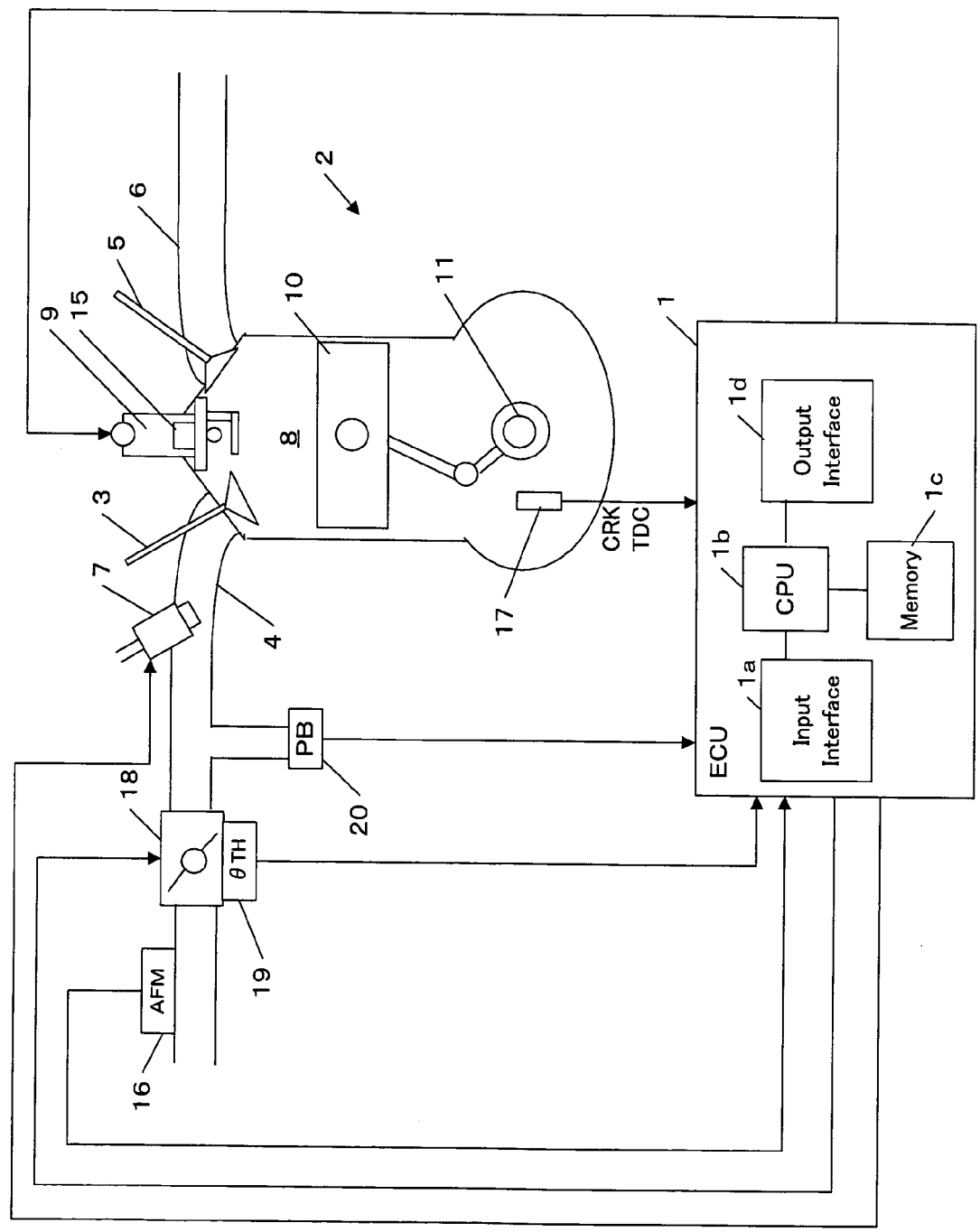
FIG. 1 is a block diagram of an engine and its control unit in accordance with one embodiment of the present invention.

Referring to the drawings, specific embodiments of the invention will be described. FIG. 1 is a block diagram showing an internal combustion engine (hereinafter referred to as an engine) and a control unit for the engine in accordance with one embodiment of the invention.

An electronic control unit (hereinafter referred to as an ECU) 1 is essentially a computer and comprises an input interface 1a for receiving data sent from each part of the vehicle, a CPU 1b for carrying out operation for controlling each part of the vehicle, a memory 1c including a read only memory (ROM) and a random access memory (RAM), and an output interface 1d for sending a control signal to each part of the vehicle. One or more programs and data for controlling each part of the vehicle are stored in the ROM. The ROM may be a rewritable ROM such as an EPROM. The RAM provides work areas for operation by the CPU 1b, in which data sent from each part of the vehicle as well as a control signal to be sent out to each part of the vehicle are temporarily stored.

An engine 2 is, for example, a 4-cycle engine. The engine 2 typically comprises a plurality of cylinders. For the purpose of simplicity, one of the cylinders is shown in the figure. The chamber 8 of the engine 2 is connected to an intake manifold 4 through an air intake valve 3 and connected to an exhaust manifold 6 through an exhaust valve 5. A fuel injection valve 7 for injecting fuel in accordance with a control signal from the ECU 1 is disposed in the intake manifold 4.

The engine 2 takes air-fuel mixture from the air taken from the intake manifold 4 and the fuel injected by the fuel injection valve 7 into the combustion chamber 8. A spark plug 9 is provided in the combustion chamber 8 to ignite a spark in accordance with an ignition timing signal from the ECU 1. The air-fuel mixture is burned by the spark. The combustion increases the volume of the mixture, which pushes the piston 10 down. The reciprocating motion of the piston 10 is converted into the rotation motion of the crankshaft 11.

An in-cylinder pressure sensor 15 is embedded in a portion, contacting with the cylinder, of the spark plug 9. The in-cylinder pressure sensor 15 generates a signal indicating a change rate of the pressure within the combustion chamber 8 (in-cylinder pressure). The signal is sent to the ECU 1.

A crank angle sensor 17 is disposed in the engine 2. The crank angle sensor 17 outputs a CRK signal and a TDC signal to the ECU 1 in accordance with the rotation of the crankshaft 11.

The CRK signal is a pulse signal that is output at every predetermined crank angle. The ECU 1 calculates a rotational speed NE of the engine 2 in accordance with the CRK signal. The TDC signal is also a pulse signal that is output at a crank angle associated with the TDC position of a piston 10.

A throttle valve 18 is disposed in the intake manifold 4 of the engine 2. An opening degree of the throttle valve 18 is controlled by a control signal from the ECU 1. A throttle valve opening sensor (θTH) 19, which is connected to the throttle valve 18, supplies the ECU 1 with a signal indicating the opening degree of the throttle valve 18.

An intake manifold pressure (Pb) sensor 20 is disposed downstream of the throttle valve 18. The intake manifold pressure Pb detected by the Pb sensor 20 is sent to the ECU 1.

An airflow meter (AFM) 16 is disposed upstream of the throttle valve 18. The airflow meter 16 detects the amount of air passing through the throttle valve 18. The detected amount of air is sent to the ECU 1.

A signal sent to the ECU 1 is passed to the input interface 1a. The input interface 1a converts an analog signal value into a digital signal value. The CPU 1b processes the resulting digital signal in accordance with a program stored in the memory 1c, and creates a control signal. The output interface 1d sends the control signal to actuators for the fuel injection valve 7, spark plug 9, throttle valve 18, and other mechanical components. The CPU 1b can use a digital signal value converted from an analog signal value to calculate the in-cylinder pressure of the engine in accordance with one or more programs stored in the memory 1c.

Figure 2:
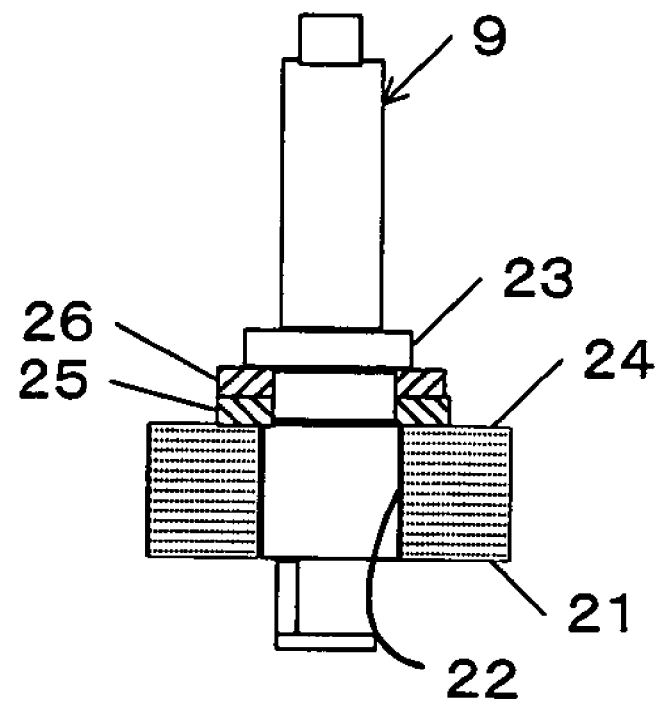
FIG. 2 schematically shows an in-cylinder pressure sensor in accordance with one embodiment of the present invention.

FIG. 2 shows an example of the in-cylinder pressure sensor 15. The spark plug 9 is screwed in a screw hole 22 of a cylinder head 21. A sensor element 25 of the in-cylinder pressure sensor and a washer 26 are sandwiched between a spark plug attaching surface 23 and a spark plug washer surface 24 of the cylinder head 21. The sensor element 25 is a piezo-electric element.

Since the sensor element 25 is tightened as a washer of the spark plug 9, the sensor element 25 is given a predetermined tightening load. When the pressure within the combustion chamber 8 changes, the load applied to the sensor element portion 25 changes. The in-cylinder pressure sensor 15 detects a change in the load relative to the predetermined tightening load as a change in the in-cylinder pressure.

A frequency band of the in-cylinder pressure depends on the rotational speed of the engine. Specifically, the frequency band of the in-cylinder pressure ranges from zero to the k-th order frequency of the engine rotational speed (where k is equal to or greater than 2).

However, the in-cylinder pressure that is actually required for an engine control has first and higher-order frequency components of the engine rotational speed. In other words, frequency components lower than the first order frequency component are not required for an engine control. The reason for this will be briefly described.

A typical example of an engine control using the in-cylinder pressure is calculation of the workload of the engine such as an "indicated mean effective pressure." The workload of the engine can be used for evaluating the performance of the engine. The indicated mean effective pressure Pmi is represented as a correlation coefficient between an in-cylinder pressure P and a volume change rate dV as shown in the equation (1). Vs represents the stroke volume of the engine.

$$Pmi = \frac{1}{Vs} \oint PdV \qquad (1)$$

In order to resolve the frequency of the volume change rate dV, the Fourier series expansion is applied to the volume change rate dV as shown by the equation (2). In the equation (2), "t" represents time, T represents the length of one rotation cycle of the crankshaft of the engine (referred to as a crank cycle), and "ω" represents its angular frequency. For a 4-cycle engine, T corresponds to 360 degrees. "k" represents the order of the frequency of the engine rotation.

$$dV(\omega t) = f(t) = \frac{V_{a0}}{2} + \sum_{k=1}^{\infty}(V_{ak}\cos k\omega t + V_{bk}\sin k\omega t) \quad (2)$$

$$V_{a0} = \frac{2}{T}\int_0^T f(t)dt$$

$$V_{ak} = \frac{2}{T}\int_0^T f(t)\cos k\omega t\, dt$$

$$V_{bk} = \frac{2}{T}\int_0^T f(t)\sin k\omega t\, dt$$

The equation (3) is derived by applying the equation (2) to the equation (1). Here, $\theta=\omega t$.

$$Pmi = \frac{1}{V_s}\oint Pd\,v = \frac{1}{V_s}\oint P \times \left\{\frac{V_{a0}}{2} + \sum_{k=1}^{\infty}(V_{ak}\cos k\theta + V_{bk}\sin k\theta)\right\}d\theta = \quad (3)$$

$$\frac{1}{V_s}\oint P \times \left\{\frac{V_{a0}}{2} + V_{a1}\cos\theta + V_{a2}\cos 2\theta + V_{a3}\cos 3\theta + V_{a4}\cos 4\theta + \right.$$

$$\left. \ldots + V_{b1}\sin\theta + V_{b2}\sin 2\theta + V_{b3}\sin 3\theta + + V_{b4}\sin 4\theta + \ldots\right\}$$

$$d\theta = \frac{1}{V_s}\oint P\frac{V_{a0}}{2}d\theta + \frac{V_{a1}}{V_s}\oint P\cos\theta d\theta +$$

$$\frac{V_{a2}}{V_s}\oint P\cos 2\theta d\theta + \ldots + \frac{V_{b1}}{V_s}\oint P\sin\theta d\theta +$$

$$\frac{V_{b2}}{V_s}\oint P\sin 2\theta d\theta + \ldots$$

Figure 3:
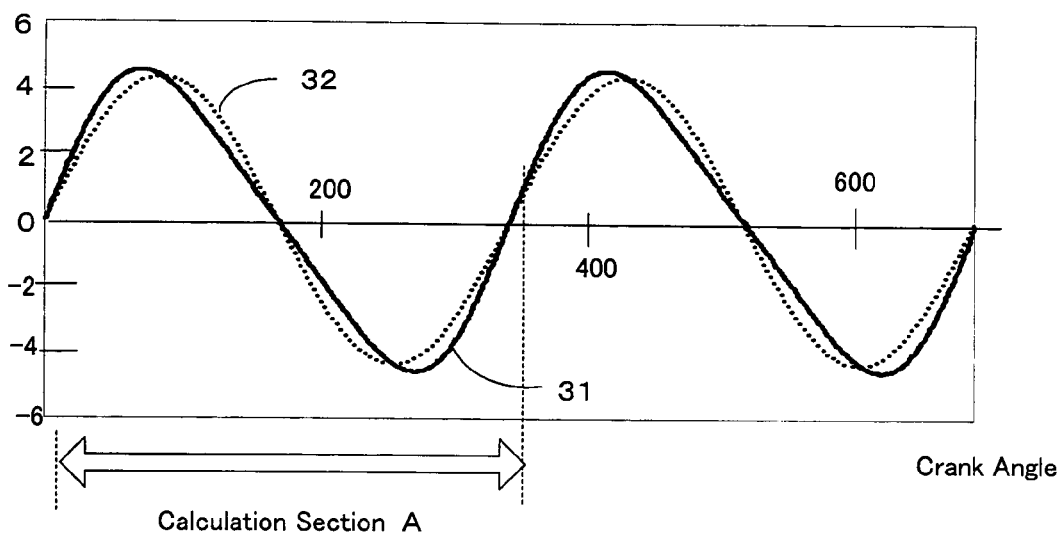
FIG. 3 schematically shows (a) a waveform and (b) frequency components of a volume change rate of a cylinder in accordance with one embodiment of the present invention.
Figure 3:
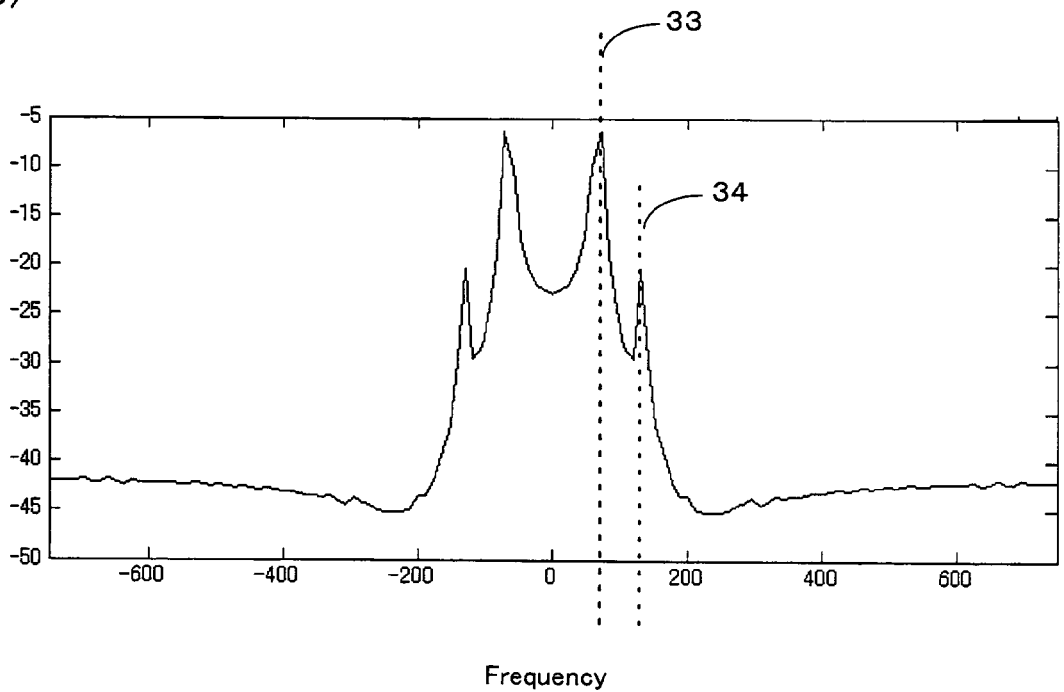

Referring to FIG. 3(a), a waveform 31 of the volume change rate dV for a typical engine and a waveform 32 of the sine function having the same cycle length as the waveform 31 are shown. As can be seen, there is much similarity between the two waveforms. The volume change rate dV has little offset and phase difference with respect to the sine function. Therefore, it can be seen that the volume change rate has little direct current component a0 and cosine components.

FIG. 3(b) shows a result of the FFT analysis for the volume change rate dV shown in FIG. 3(a). A line 33 indicates the first-order frequency of the engine rotational speed. A line 34 indicates the second-order frequency of the engine rotational speed. Thus, the volume change rate dV has mainly the first and second order frequency components of the engine rotational speed.

Figure 4:
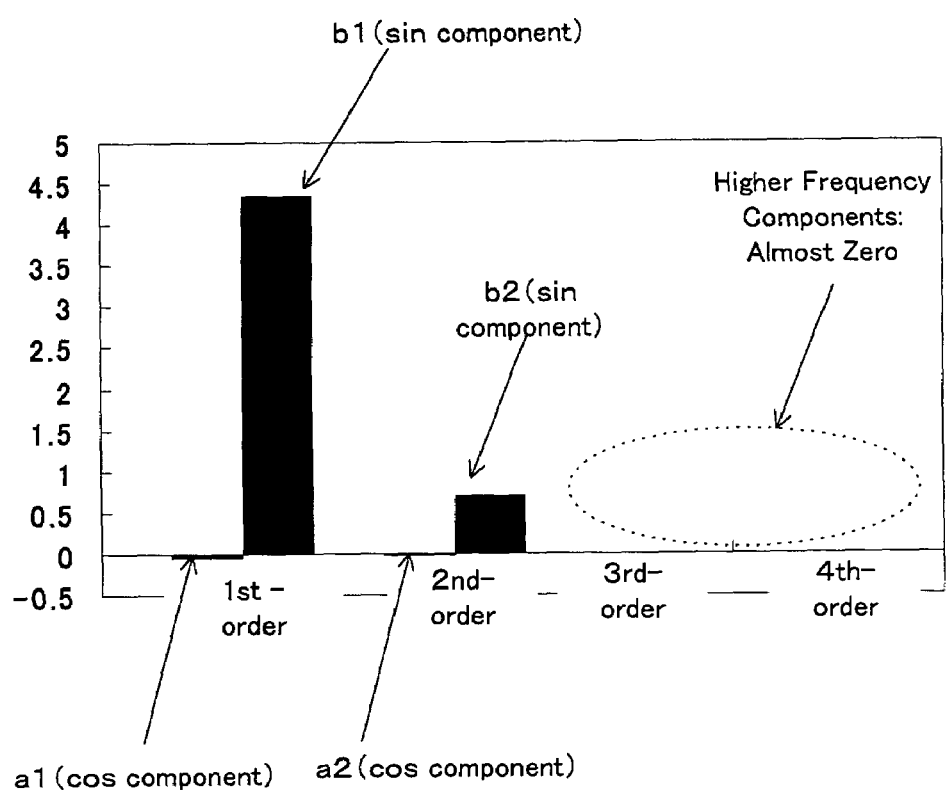
FIG. 4 shows the Fourier coefficients of a volume change rate in accordance with one embodiment of the present invention.

Referring to FIG. 4(a), an example of Fourier coefficients of the volume change rate dV that were actually calculated for the section A shown in FIG. 3(a) is shown. FIG. 4(b) shows the magnitude of each Fourier coefficient shown in FIG. 4(a). It can be seen that the direct current component Va0 and the cosine components Vak (k=1, 2, . . . ) are almost zero. It can be also seen that the third and higher-order sine components Vb3, Vb4, . . . are almost zero.

Thus, the volume change rate dV is mainly composed of the first and second order frequency components of the engine rotational speed. Therefore, for the in-cylinder pressure P that is to be multiplied by the volume change rate dV in the equation (3), the first and second order frequency components of the engine rotational speed are mainly required.

As shown in the equation (4), a signal P, which indicates an in-cylinder pressure, is determined by integrating an in-cylinder pressure change signal dP obtained from the in-cylinder pressure sensor.

$$P = \int dP \quad (4)$$

Because frequency components of the sine wave (sin θ) and the cosine wave (cos θ) do not change through the integration as shown in the equations (5) and (6), the in-cylinder pressure change signal dP has the same frequency components as the in-cylinder pressure signal P. Therefore, although the frequency band of the in-cylinder pressure change signal dP actually ranges from zero to the k-th order frequency of the engine rotational speed, the indicated mean effective pressure Pmi can be calculated by extracting only the first and higher order frequency components of the engine rotational speed from the in-cylinder pressure change signal dP. In other words, in the in-cylinder pressure change signal dP, frequency components lower than the first order of the engine rotational speed are not required.

$$\int(\sin\theta) = \cos\theta \quad (5)$$

$$\int(\cos\theta) = \sin\theta \quad (6)$$

On the other hand, it is known that a drift of the in-cylinder pressure is caused mainly by a change of the temperature of the in-cylinder pressure sensor. The temperature of the in-cylinder pressure sensor is influenced by the temperature of the engine because the in-cylinder pressure sensor is disposed in the cylinder of the engine as described above.

The inventors recognized that a change in the temperature of the in-cylinder pressure sensor has a much longer cycle length (that is, low frequency), compared with a change in the in-cylinder pressure actually used for an engine control. As described above, this in-cylinder pressure used for an engine control has first and higher order frequency components of the engine rotational speed. Accordingly, a drift of the in-cylinder pressure has significantly lower frequency than the first-order frequency of the engine rotational speed.

Thus, because a drift of the in-cylinder pressure occurs at a significantly lower frequency than the first-order frequency of the engine rotational speed, the drift can be removed from the in-cylinder pressure signal P by cutting frequency components lower than the first-order frequency of the engine rotational speed from the in-cylinder pressure change signal dP.

In this embodiment, a drift is removed from the in-cylinder pressure signal P by cutting frequency components lower than the first-order frequency of the engine rotational speed because the in-cylinder pressure that is actually used for an engine control has first and higher-order frequencies of the engine rotational speed. However, it should be noted that even when the in-cylinder pressure that is actually used for an engine control has frequency components lower than the first-order frequency of the engine rotational speed, the present invention can be applied as long as the frequency band of the in-cylinder pressure is higher than the frequency band of the drift.

As an example, consider an operating condition where the engine rotational speed NE is 6000 rpm(revolutions per minute). When the output of the in-cylinder pressure is sampled at every one degree of the crank angle, a sampling frequency Fs is 36 kHz as shown in the equation (7) and a Nyquist frequency Fn is 18 kHz.

$$(6000/60) \times 360 = 36\text{ kHz} \quad (7)$$

The first-order frequency of the engine rotational speed is 100 Hz. Therefore, the in-cylinder pressure signal containing no drift can be obtained by cutting frequency components lower than 100 Hz from the output of the in-cylinder pressure sensor.

Figure 5:
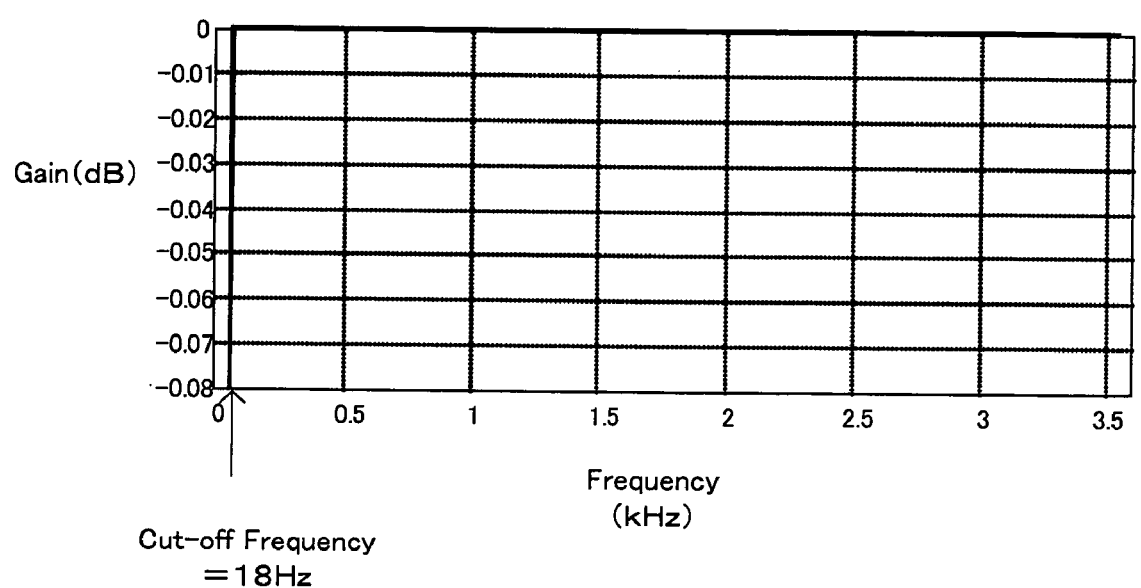
FIG. 5 shows characteristics of a high-pass filter in accordance with one embodiment of the present invention.

A simulation based on this example was performed. In the simulation, a filter having the characteristics as shown in FIG. 5 is applied to the output signal dP of the in-cylinder pressure sensor. This filter is a third-order IIR Butterworth high-pass filter.

The cut-off frequency is set so that frequency components lower than the first-order frequency of the engine rotational speed are cut. Preferably, the cut-off frequency is set to be lower than the first-order frequency of the engine rotational speed and to be capable of surely cutting the frequency band of a drift.

As described above, frequency components composing a drift mainly depend on the temperature of the in-cylinder pressure sensor. In addition, it was identified from the simulation that the frequency of a drift may increase with an increase of the engine rotational speed. If the cut-off frequency is too low, frequency components composing a drift may not be completely removed. Further, because a signal may be attenuated in frequencies slightly higher than the cut-off frequency, the accuracy of the in-cylinder pressure signal after the filtering may deteriorate if the cut-off frequency is too close to the first-order frequency of the engine rotational speed.

In the above simulation, it was recognized that a drift can be surely removed by cutting at least frequency components lower than 18 Hz when the engine rotational speed is 6000 rpm (that is, when the first-order frequency is 100 Hz). Accordingly, the cut-off frequency was set to 18 Hz.

The transfer function of the above-described filter used in this simulation is expressed as shown by the equation (8). dPH indicates the output signal of the high-pass filter. "k" represents a sampling time.

$$dPH(k) = 0.997 \times dP(k) - 2.990 \times dP(k-1) + \qquad (8)$$
$$2.990 \times dP(k-2) - 0.997 \times dP(k-3) - 2.994 \times dPH(k-1) +$$
$$2.998 \times dPH(k-2) - 0.994 \times dPH(k-3)$$

Alternatively, an FIR high-pass filter may be used. The order and the coefficients of the filter can be determined depending on the filter characteristics.

Figure 6:
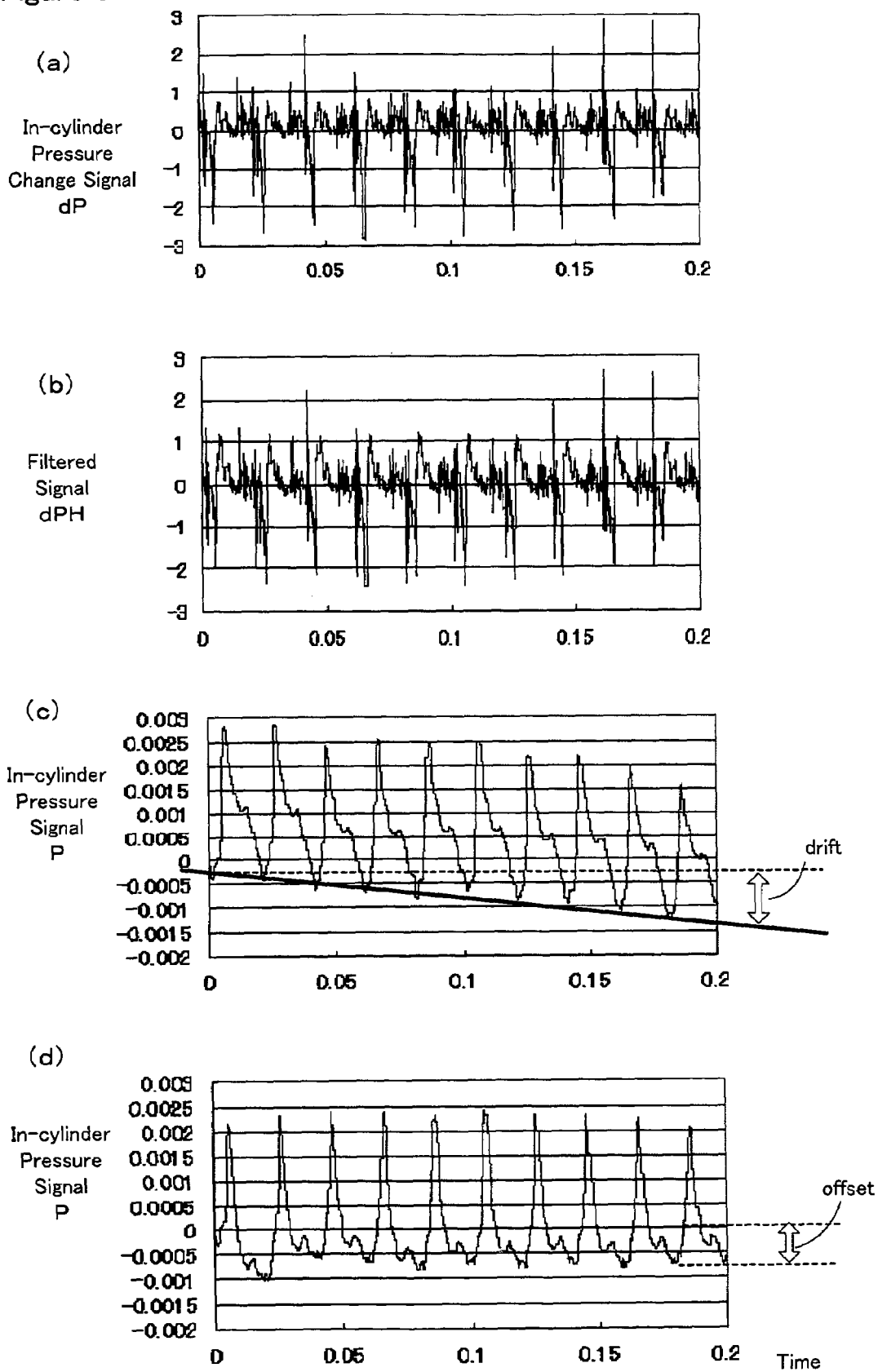
FIG. 6 shows an effect of applying a high-pass filter in accordance with one embodiment of the present invention.

FIG. 6 shows a result of this simulation. FIG. 6(a) shows the in-cylinder pressure change signal dP from the in-cylinder pressure sensor. FIG. 6(b) shows the signal dPH obtained by applying the above-described high-pass filter to the in-cylinder pressure change signal dP. FIG. 6(c) shows the in-cylinder pressure signal P obtained by integrating the in-cylinder pressure change signal dP shown in FIG. 6(a). FIG. 6(d) shows the in-cylinder pressure signal P obtained by integrating the signal dPH of FIG. 6(b) in accordance with the equation (9).

$$P(k)=P(k-1)+(dPH(k)\times(1/Fs)) \qquad (9)$$

It can be seen that there is a drift in the waveform of FIG. 6(c). The drift increases with time because the drift is accumulated over the combustion cycles.

There is no significant difference between FIG. 6(a) and FIG. 6(b). However, as can be seen from the comparison between FIG. 6(c) and FIG. 6(d), a drift-removed in-cylinder pressure signal P can be obtained by integrating the output signal dPH of the high-pass filter.

As shown in FIG. 6(d), although the in-cylinder pressure signal P exhibits a stable value by virtue of the application of the high-pass filter, it has an offset from zero. This is because the high-pass filter needs past values of the output of the high-pass filter as shown in the equation (8). At the early stage of the in-cylinder pressure change signal, past values are not acquired yet, which results in an offset. Such an offset can be removed by a removing unit, which will be described later.

Figure 7:
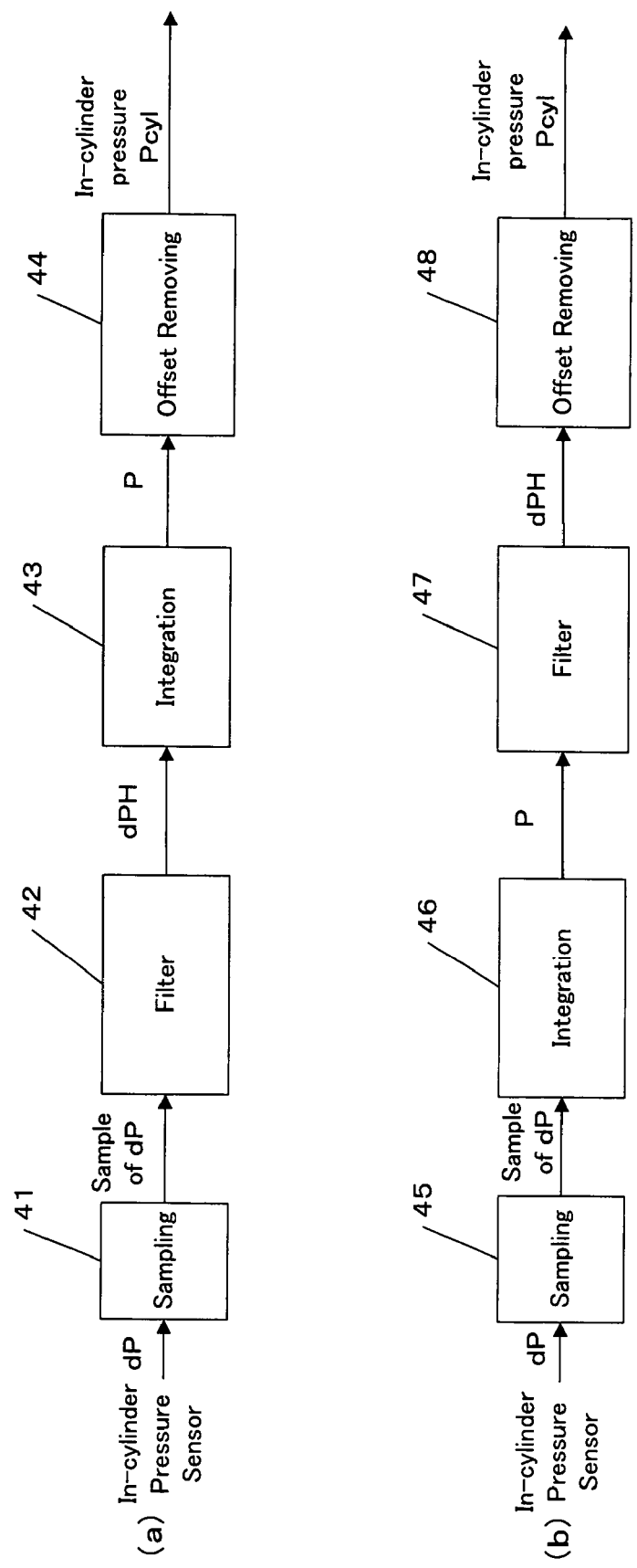
FIG. 7(a) is a block diagram of an in-cylinder pressure detecting apparatus in accordance with one embodiment of the present invention.
FIG. 7(b) is a block diagram of an in-cylinder pressure detecting apparatus in accordance with another embodiment of the present invention.

FIG. 7 is a block diagram of an in-cylinder pressure detecting apparatus in accordance with one embodiment of the present invention. The functions of the blocks in the figure can be typically implemented by ECU 1 (FIG. 1). For example, the functions can be implemented by one or more programs stored in the memory 1c of the ECU 1 (FIG. 1). Alternatively, these functions may be implemented by hardware.

A sampling unit 41 samples the in-cylinder pressure change signal dP from the in-cylinder pressure sensor. A filter unit 42 comprises a high-pass filter as described above. This high-pass filter has the characteristics of cutting frequency components lower than the first-order frequency of the engine rotational speed NE. As described above, preferably, the cut-off frequency of the high-pass filter is set to be lower than the first-order frequency of the engine rotational speed as well as being capable of surely cutting frequency components composing a drift.

The filter unit 42 applies a high-pass filter to samples of the in-cylinder pressure change signal dP to generate a signal dPH. An example of the equation performed by the high-pass filter is shown in the above equation (8). The signal dPH does not contain frequency components composing a drift. An integration unit 43 integrates the output signal dPH from the filter unit 42 in accordance with the above equation (9) to determine the in-cylinder pressure signal P. An offset removing unit 44 removes the offset of the in-cylinder pressure signal P as seen in FIG. 6(d). Thus, a drift-removed in-cylinder pressure Pcyl having no offset is calculated.

FIG. 7(b) is a block diagram of an in-cylinder pressure detecting apparatus in accordance with another embodiment of the present invention. Similarly to the embodiment of FIG. 7(a), the functions of blocks in the figure can be typically implemented by the ECU 1.

A difference from FIG. 7(a) is in that a filter unit 47 is disposed downstream of the integration unit 46. A sampling unit 42 samples the in-cylinder pressure change signal dP from the in-cylinder pressure sensor. The integration unit 46 uses samples of the in-cylinder pressure change signal dP to calculate the integral of the in-cylinder pressure change signal dP (that is, the in-cylinder pressure signal P). This integration is performed in accordance with the equation (10).

$$P(k)=P(k-1)+(dP(k)\times(1/Fs)) \qquad (10)$$

The filter unit 47 comprises a high-pass filter similar to the filter unit 42. An example of the equation performed by the high-pass filter is shown in the equation (11).

$$dPH(k) = \qquad (11)$$
$$0.997 \times P(k) - 2.990 \times P(k-1) + 2.990 \times P(k-2) - 0.997 \times P(k-3) -$$
$$2.994 \times dPH(k-1) + 2.998 \times dPH(k-2) - 0.994 \times dPH(k-3)$$

As described above, the integration of a signal does not change the frequency components. Therefore, the output signal dPH from the filter unit 47 is the same as the in-cylinder pressure signal P shown in FIG. 6(d). An offset removing unit 48 removes the offset of the output signal dPH. Thus, a drift-removed in-cylinder pressure having no offset Pcyl is calculated.

Figure 8:
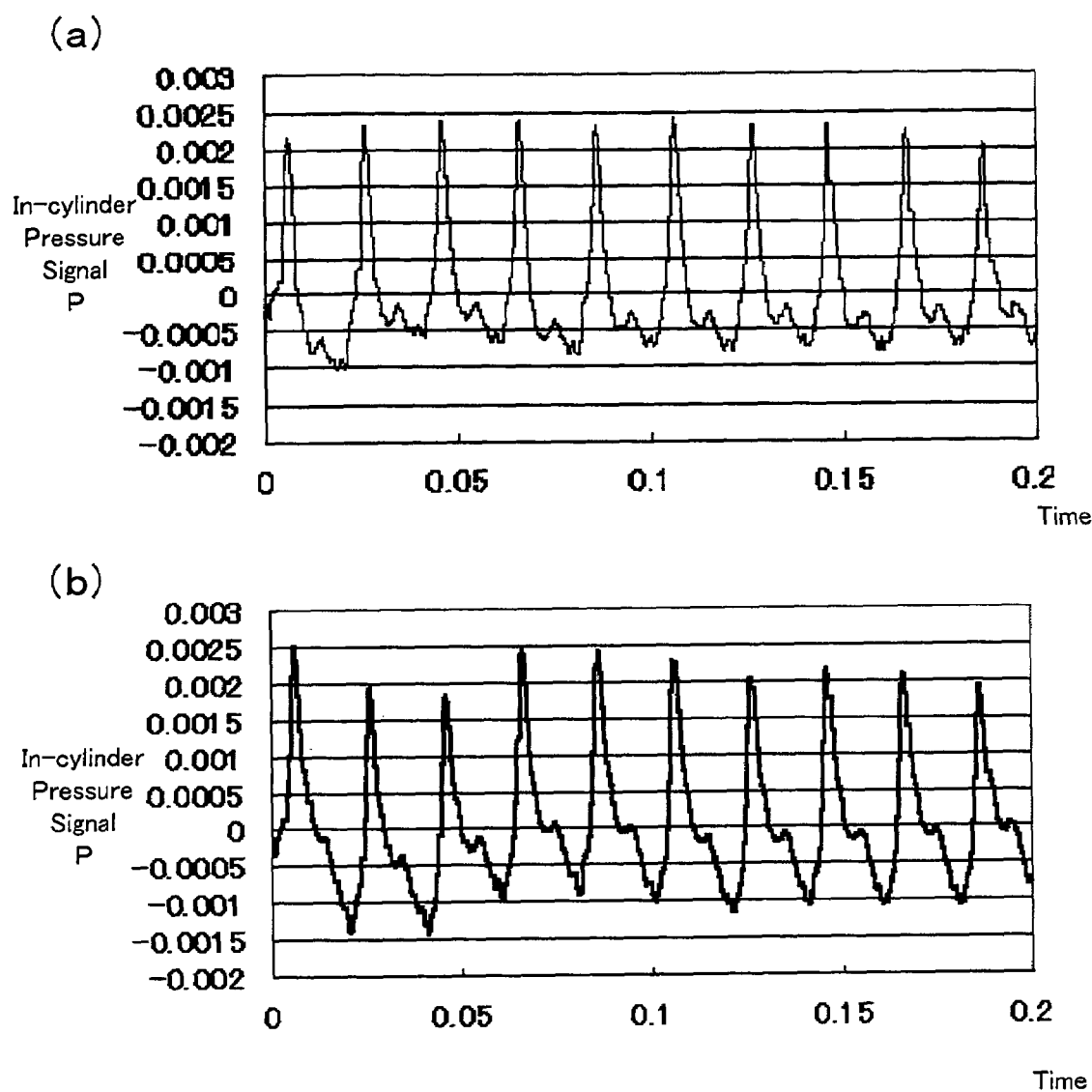
FIG. 8 shows a case where a cut-off frequency is not switched correspondingly to an engine rotational speed in accordance with one embodiment of the present invention.

Referring to FIG. 8, a relationship between the engine rotational speed and the cut-off frequency of the high-pass filter of the filter unit 42 will be described. FIG. 8(a) shows the in-cylinder pressure signal P obtained from the integration unit 43 when the high-pass filter having the cut-off frequency of 18 Hz is applied to the in-cylinder pressure change signal dP. FIG. 8(b) shows the in-cylinder pressure signal P obtained from the integration unit 43 when the high-pass filter having the cut-off frequency of 9 Hz is applied to the in-cylinder pressure change signal dP. Here, for both cases, the engine rotational speed is 6000 rpm.

As described above, the cut-off frequency for cutting at least frequency components of a drift when the engine rotational speed is 6000 rpm is 18 Hz. As shown in FIG. 8(b), if the high-pass filter having the cut-off frequency of 9 Hz is applied to the in-cylinder pressure change signal dP when the engine rotational speed is 6000 rpm, frequency components of the drift cannot be completely removed. As a result, the waveform of FIG. 8(b) has distortion, compared with the waveform of FIG. 8(a).

Such phenomenon is caused by the fact that the frequency band of a drift changes due to not only the temperature of the in-cylinder pressure sensor but also the engine rotational speed. In order to prevent such phenomenon, it is preferable to configure the filter by selecting the cut-off frequency corresponding to the detected engine rotational speed. Because the frequency band of the in-cylinder pressure increases with an increase of the engine rotational speed, the cut-off frequency also increases with an increase of the engine rotational speed. By changing the cut-off frequency in accordance with the engine rotational speed, only the frequency components of a drift can be effectively removed without cutting necessary frequency components of the in-cylinder pressure.

Referring to the following two cases, changing the cut-off frequency will be described. In the first case, the output of the in-cylinder pressure sensor is sampled in synchronization with the crank angle CRK. A sampling frequency Fs changes in synchronization with the engine rotational speed NE. For example, when the engine rotational speed is 1500 rpm and a sampling is performed at every one degree of the crank angle, 360 times of sampling are performed within one rotation of the engine. The sampling frequency is calculated as shown by the equation (12).

$$1500 \text{ (rpm)}/60 \text{ (seconds)} \times 360 \text{ (times)} = 9 \text{ (kHz)} \quad (12)$$

The Nyquist frequency is 4.5 kHz. Because the engine rotational speed is 1500 rpm, the first-order frequency of the engine rotational speed is 1500/60=25 Hz. Thus, the cut-off frequency is set to be lower than 25 Hz. In this example, according to the simulation and so on, 4.5 Hz is selected as the cut-off frequency that is lower than the first-order frequency of the engine rotational speed and is capable of surely cutting the frequency band of a drift.

When the cut-off frequency is normalized with the Nyquist frequency, the cut-off frequency is represented by 0.001 according to the equation (13).

$$4.5 \text{ Hz}/4.5 \text{ kHz} = 0.001 \quad (13)$$

Similarly, a normalized cut-off frequency for each of the cases where the engine rotational speed is 3000 rpm and 6000 rpm can be determined, which is shown in Table 1. These cut-off frequencies are also selected to be lower than the first-order frequency of the engine rotational speed and capable of surely cutting the frequency band of a drift.

TABLE 1

| NE (rpm) | Fs (kHz) | Fn (kHz) | First-order frequency of NE (Hz) | Cutoff frequency Fc (Hz) | Normalized cutoff frequency |
|---|---|---|---|---|---|
| 1500 | 9 | 4.5 | 25 | 4.5 | 0.001 |
| 3000 | 18 | 9 | 50 | 9 | 0.001 |
| 6000 | 36 | 18 | 100 | 18 | 0.001 |

As shown in Table 1, the cut-off frequency changes depending on the engine rotational speed NE. However, the normalized cut-off frequency is constant. That is, the filter characteristics do not change. The cut-off frequency can be determined by multiplying the Nyquist frequency Fn by the constant value of 0.001. Thus, because the normalized cut-off frequency is constant when the output of the in-cylinder pressure sensor is sampled in synchronization with the engine rotation, the filter having the cut-off frequency corresponding to the engine rotational speed can be configured without changing its filter characteristics.

In the second case, the output of the in-cylinder pressure sensor is sampled at a constant time interval. In this case, the sampling frequency Fs is constant. For example, Fs is 36 kHz. The Nyquist frequency Fn is 18 kHz.

When the engine rotational speed is 1500 rpm, the first-order frequency of the engine rotational speed is 1500/60=25 Hz. The cut-off frequency is set to 4.5 Hz.

When the cut-off frequency is normalized with the Nyquist frequency, the cut-off frequency is calculated as shown by the equation (14).

$$4.5 \text{ (Hz)}/18000 \text{ (Hz)} = 0.00025 \quad (14)$$

Similarly, a normalized cut-off frequency for each of the cases where the engine rotational speed is 3000 rpm and 6000 rpm can be determined, which is shown in Table 2.

TABLE 2

| NE (rpm) | Fs (kHz) | Fn (kHz) | First-order frequency of NE(Hz) | Cutoff frequency Fc (Hz) | Normalized cutoff frequency |
|---|---|---|---|---|---|
| 1500 | 36 | 18 | 25 | 4.5 | 0.00025 |
| 3000 | 36 | 18 | 50 | 9 | 0.0005 |
| 6000 | 36 | 18 | 100 | 18 | 0.001 |

As shown in Table 2, not only the cut-off frequency but also the normalized cut-off frequency changes depending on the engine rotational speed NE. This indicates that the filter characteristics change. Thus, when the output of the in-cylinder pressure sensor is sampled at a predetermined time interval, the normalized cut-off frequency changes. Therefore, it is preferable to change the filter characteristics depending on the engine rotational speed NE so that the cut-off frequency corresponding to the engine rotational speed NE can be established.

In one embodiment of the present invention, in order to change the filter characteristics in accordance with the engine rotational speed NE, the cut-off frequency corresponding to the engine rotational speed NE is implemented by providing a single high-pass filter. The characteristics of this filter are changed in accordance with the engine rotational speed.

In another embodiment, a plurality of high-pass filters are provided in the filter unit 42 as shown in Table 3. One of the high-pass filters having a cut-off frequency corresponding to the detected engine rotational speed is selected.

TABLE 3

| NE (rpm) | Filter type | Cutoff frequency (Hz) | Normalized cutoff frequency |
|---|---|---|---|
| 0~1500 | 1st Filter | 4.5 | 0.00025 |
| 1500~3000 | 2nd Filter | 9 | 0.0005 |
| 3000~6000 | 3rd Filter | 18 | 0.001 |

For example, when the engine rotational speed is between 1500 rpm and 3000 rpm, a filter having the cut-off frequency that is appropriate for 3000 rpm is selected. Thus, a phenomenon, as shown in FIG. 8, that low frequency components cannot be completely removed can be prevented.

Figure 9:
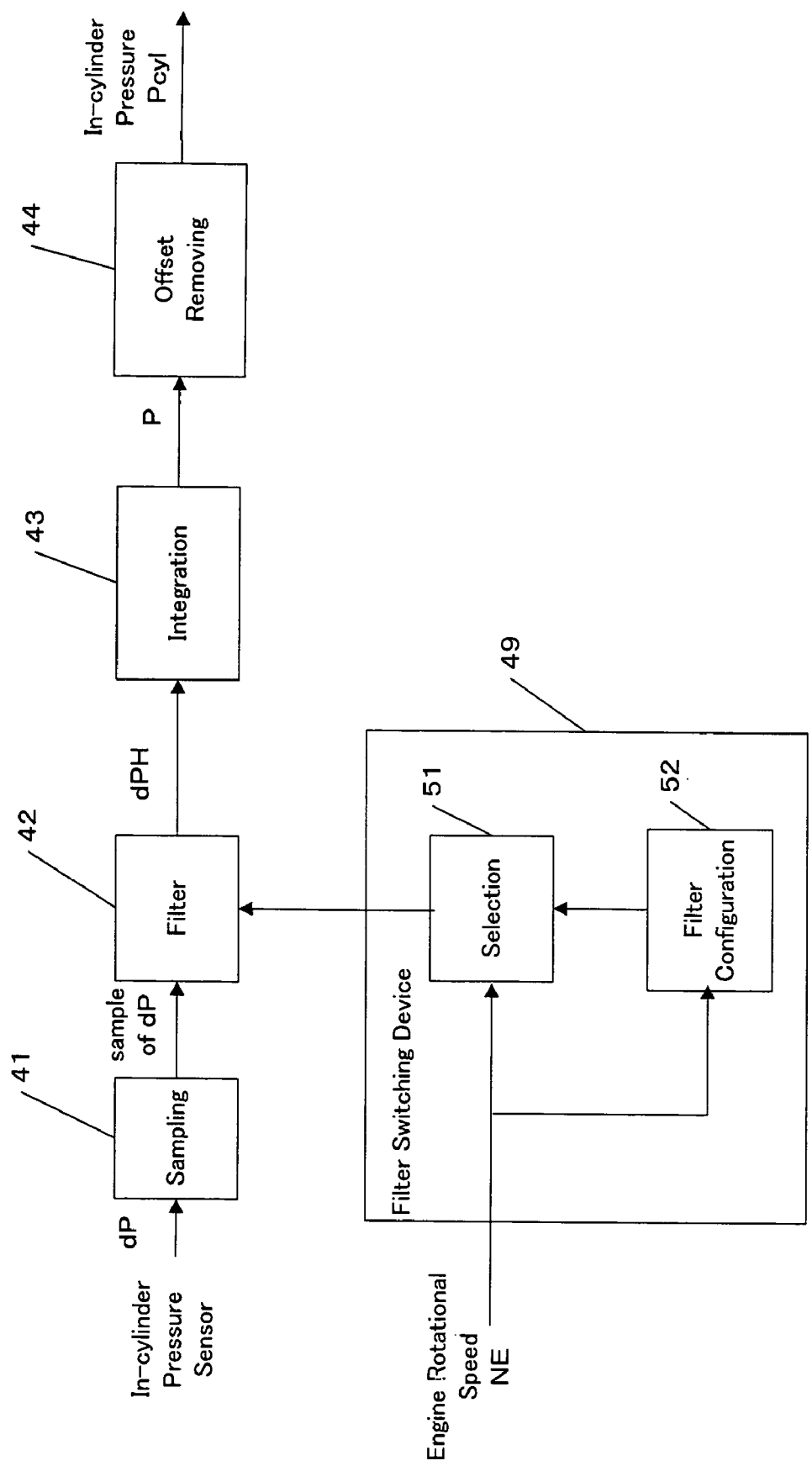
FIG. 9 is a block diagram of an in-cylinder pressure detecting apparatus including a filter switching device in accordance with one embodiment of the present invention.

FIG. 9 is a block diagram of an in-cylinder pressure detecting apparatus that can change the filter characteristics in accordance with the engine rotational speed NE, in accordance with another embodiment of the present invention. A difference from FIG. 7(a) is in that a filter switching device 49 is provided. The filter switching device 49 comprises a selection unit 51 and a filter configuration unit 52. In this embodiment, the filter switching device 49 is shown in the figure as a separate component from the filter unit 42. Alternatively, the filter unit 42 may be configured to implement the operation of the filter switching device 49.

The selection unit 51 selects a filter that is most appropriate for the current engine rotational speed NE, which is detected based on the output of the crank angle sensor 17 (FIG. 1). The selected filter is used by the filter unit 42.

The filter configuration unit 52 configures three types of the high-pass filter based on the current engine rotational speed NE. More specifically, the filter configuration unit 52 configures a filter for the current engine rotational speed, a filter for a rotational speed lower than the current engine rotational speed and a filter for a rotational speed higher than the current engine rotational speed. A cut-off frequency for each filter is set according to a manner as described above referring to Table 2.

If the engine rotational speed increases, the filter for the higher rotational speed is selected by the selection unit 51. If the engine rotational speed decreases, the filter for the lower rotational speed is selected by the selection unit 51.

Thus, three filters for the current rotational speed, the lower rotational speed and the higher rotational speed are re-configured in accordance with the detected engine rotational speed. Selecting one of the three filters having the most appropriate cut-off frequency in accordance with the engine rotational speed can be implemented.

Figure 10:
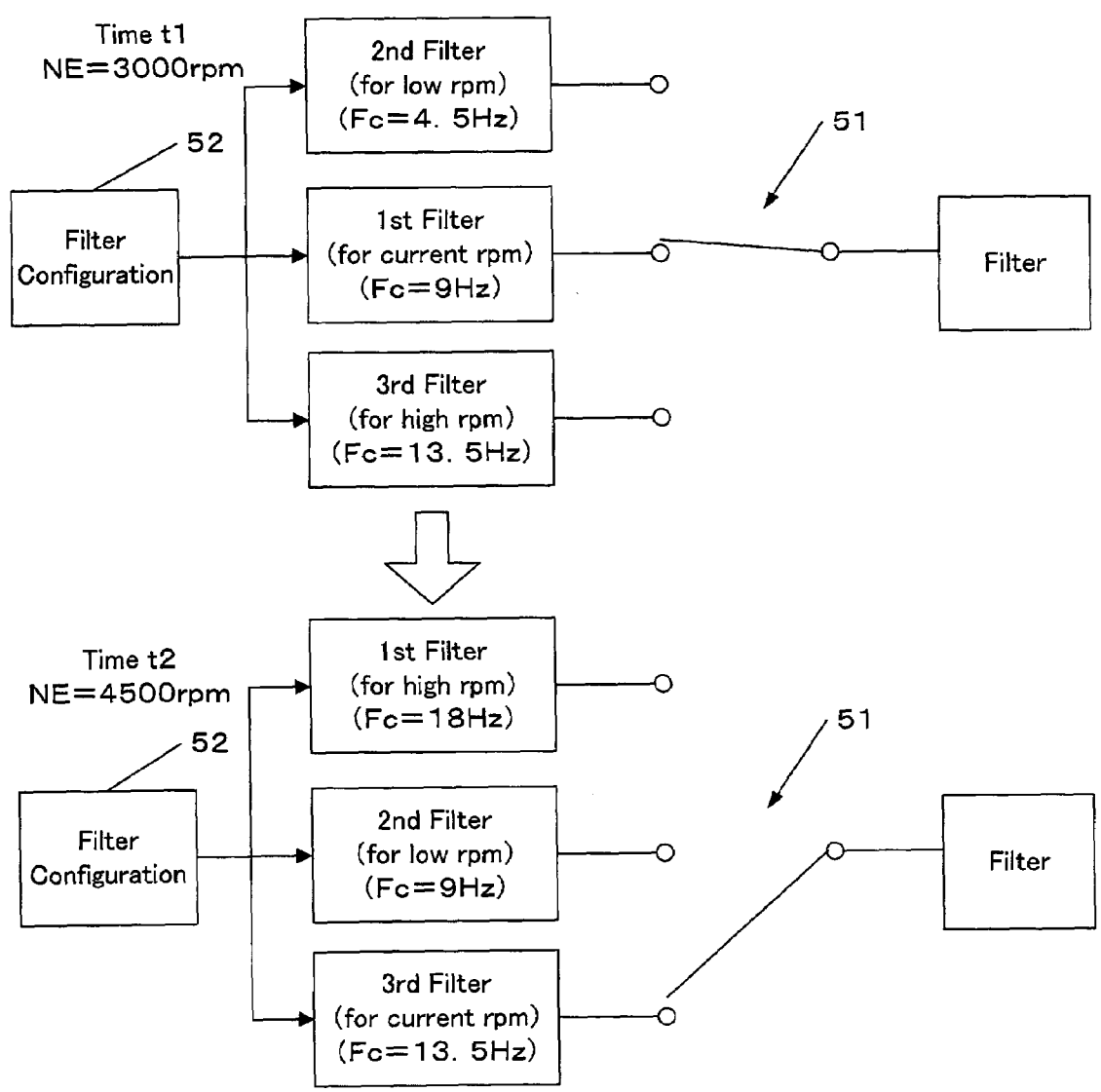
FIG. 10 schematically shows operation of a filter switching device in accordance with one embodiment of the present invention.

FIG. 10 schematically shows more specific operation of the filter switching device 49 of FIG. 9. For the purpose of simplicity, the selection unit 51 is represented by a switch.

At time t1, the engine rotational speed NE is 3000 rpm. The first filter configured to have the cut-off frequency of 9 Hz, which is most appropriate for 3000 rpm, is currently selected by the selection unit 51. The filter configuration unit 52 configures the second filter having the cut-off frequency of 4.5 Hz, which is most appropriate for 1500 rpm that is lower than the current rotational speed. The filter configuration unit 52 further configures the third filter having the cut-off frequency of 13.5 Hz, which is most appropriate for 4500 rpm that is higher than the current rotational speed.

Assuming that the engine rotational speed increases from 3000 rpm to 4500 rpm at time t2, the selection unit 51 switches from the first filter to the third filter in response to the increase in the engine rotational speed. The third filter selected by the selection unit 51 is used by the filter unit 42. The filter configuration unit 52 re-configures the other filters (the first and second filters). The filter configuration unit 52 re-configures the first filter to have the cut-off frequency of 18 Hz, which is most appropriate for 6000 rpm that is higher than the current rotational speed. The filter configuration unit 52 further re-configures the second filter to have the cut-off frequency of 9 Hz, which is most appropriate for 3000 rpm that is lower than the current rotational speed.

Thus, by removing low-frequency components through the use of the high-pass filter having the most appropriate cut-off frequency, only the frequency components of a drift can be effectively cut without cutting necessary frequency components of the in-cylinder pressure. As a result, the accuracy of the in-cylinder pressure signal can be improved.

It should be noted that the filter switching device 49 can be provided in the in-cylinder pressure detecting apparatus shown in FIG. 7(b).

Now, the offset removing unit 44 shown in FIG. 7(a) will be described referring to several embodiments. It should be noted that the following embodiments are applicable to the offset removing unit 48 shown in FIG. 7(b).

Figure 11:
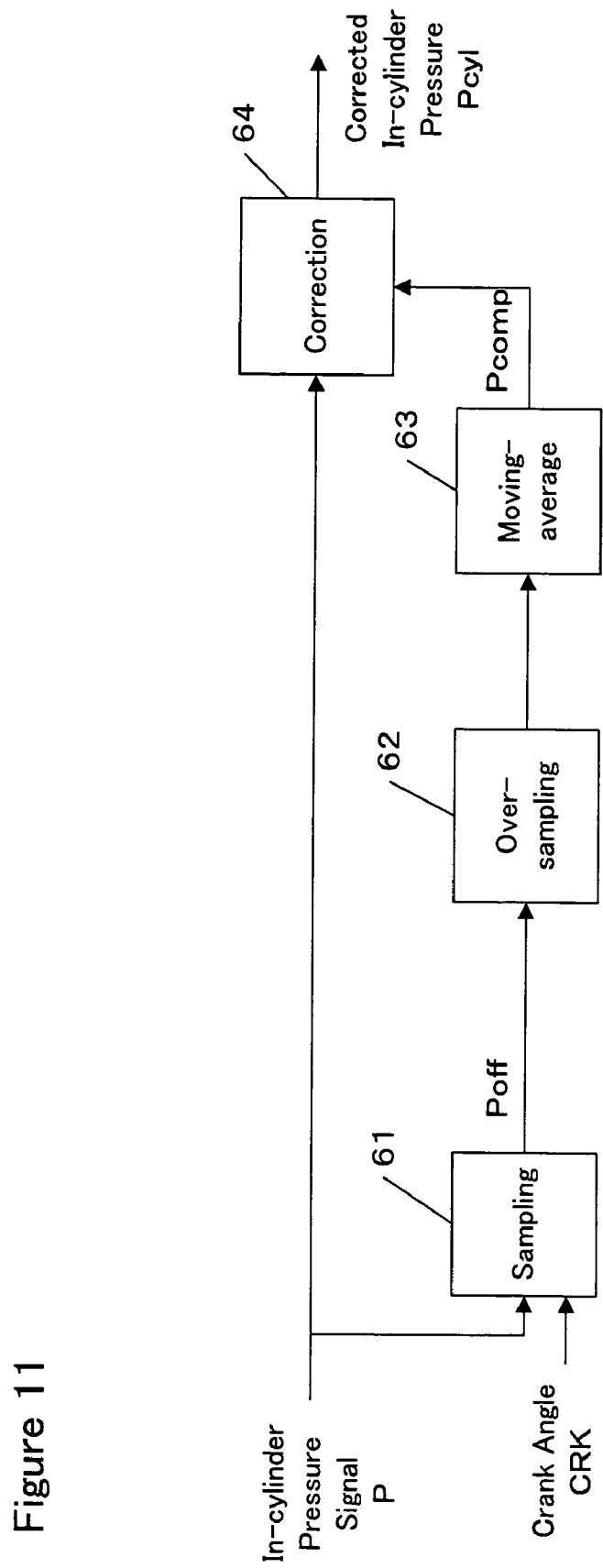
FIG. 11 is a block diagram of an offset removing unit in accordance with a first embodiment of the present invention.
Figure 12:
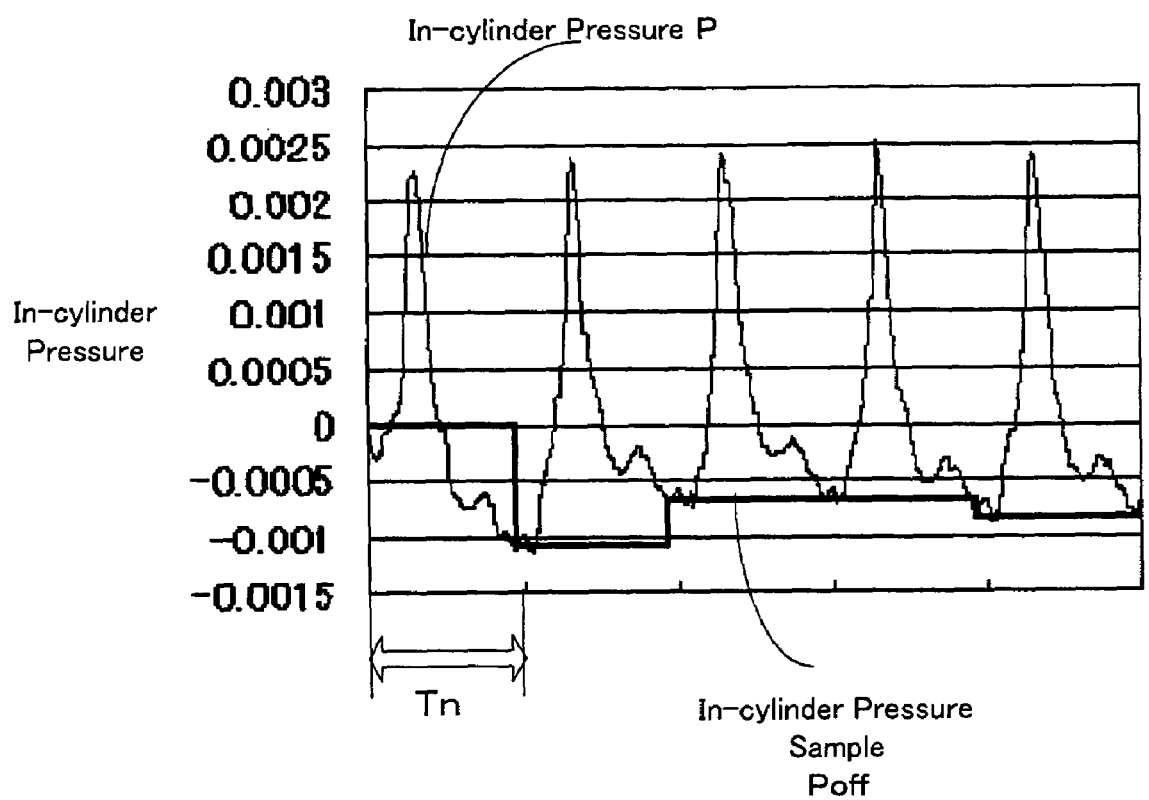
FIG. 12 schematically shows waveforms of an in-cylinder pressure P and an offset Poff in accordance with the first embodiment of the present invention.

FIG. 11 is a block diagram of an offset removing unit 44 in accordance with a first embodiment. A sampling circuit 61 samples the output signal P of the integration unit 43 at a predetermined crank angle (CRK) in each combustion cycle. Preferably, the signal P is sampled at a predetermined crank angle in the intake stroke. The sampling period is equal to a duration Tn of one combustion cycle. The in-cylinder pressure's sample Poff thus acquired is held in the sampling circuit 61. FIG. 12 shows waveforms of the in-cylinder pressure signal P and the in-cylinder pressure's sample Poff held in the sampling circuit 61. As seen in FIG. 12, the in-cylinder pressure's sample Poff indicates the above-described offset.

An over-sampling circuit 62 oversamples the offset Poff at the frequency Fs. As described above, Fs is a frequency used for sampling the output of the in-cylinder pressure sensor. The over-sampling generates a sample of the offset amount Poff.

A moving average circuit 63 updates a ring buffer in accordance with the equation (15) every time a new sample Poff(n) is acquired by the over-sampling circuit 62. The moving average circuit 63 then calculates an average of the offset amounts Poff(k−m)~Poff(k) in accordance with the equation (16). The moving average value Pcomp is used as a correction term.

Preferably, "m" is set to be equal to or larger than the number of times of the oversampling in one combustion cycle for the following reason: If m is set to be smaller than the number of times of the oversampling in one combustion cycle, all values from Poff(k−m) to Poff(k) are equal as can be seen from the equation (16) and hence the value of the correction term Pcomp becomes constant during one combustion cycle. If the value of the correction term Pcomp becomes constant, the in-cylinder pressure signal P corrected by a correction circuit 64 (that is, the corrected in-cylinder pressure Pcyl) may become discontinuous during one combustion cycle. In order to avoid such discontinuity, m is set to be equal to or larger than the number of times of the oversampling in one combustion cycle.

$$Poff(k-m) \le Poff(k-(m-1)) \quad (15)$$
$$Poff(k-(m-1)) \le Poff(k-(m-2))$$
$$\vdots$$
$$Poff(k-1) \le Poff(k)$$
$$Poff(k) \le Poff(n)$$

$$Pcomp(k) = \frac{Poff(k-m) + Poff(k-(m-1)) +, \ldots, +Poff(k-1) + Poff(k)}{(m+1)} \quad (16)$$

The correction circuit 64 calculates a corrected in-cylinder pressure Pcyl by subtracting the correction term Pcomp obtained by the moving average circuit 63 from the in-cylinder pressure P obtained by the integration unit 43. Thus, the in-cylinder pressure Pcyl having no offset can be determined.

Figure 13:
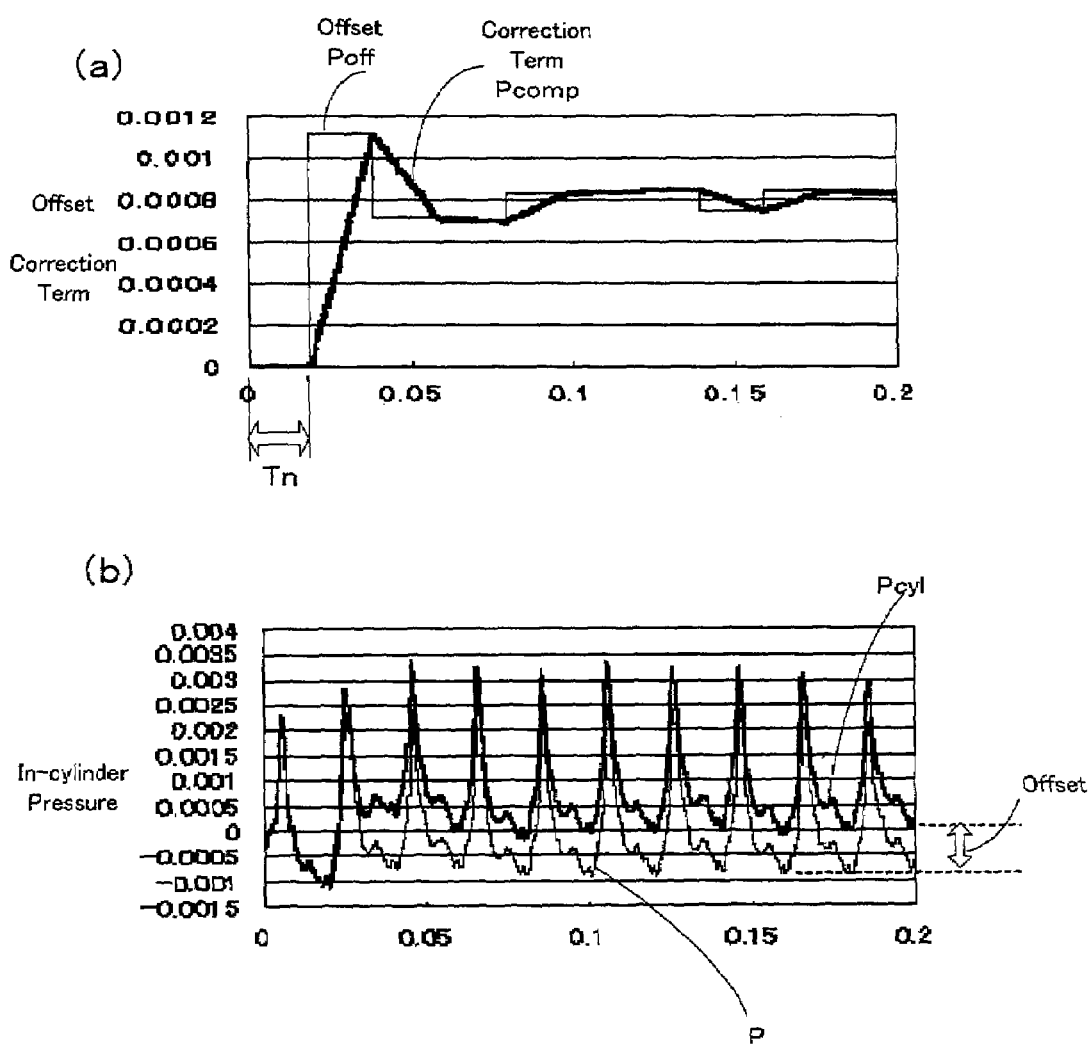
FIG. 13 schematically shows waveforms of an offset Poff, a moving average value Pcomp and a corrected in-cylinder pressure Pcyl in accordance with the first embodiment of the present invention.

Referring to FIG. 13(a), as an example, a waveform of the offset amount Poff obtained by the sampling circuit 61 and a waveform of the correction term Pcomp from the moving average circuit 63 are shown. FIG. 13(b) shows a waveform of the in-cylinder pressure signal P from the integration unit 43 and a waveform of the corrected in-cylinder pressure Pcyl from the correction circuit 64. It can be seen that the in-cylinder pressure signal Pcyl having no offset is calculated by correcting the in-cylinder pressure signal P with the correction term Pcomp.

Figure 14:
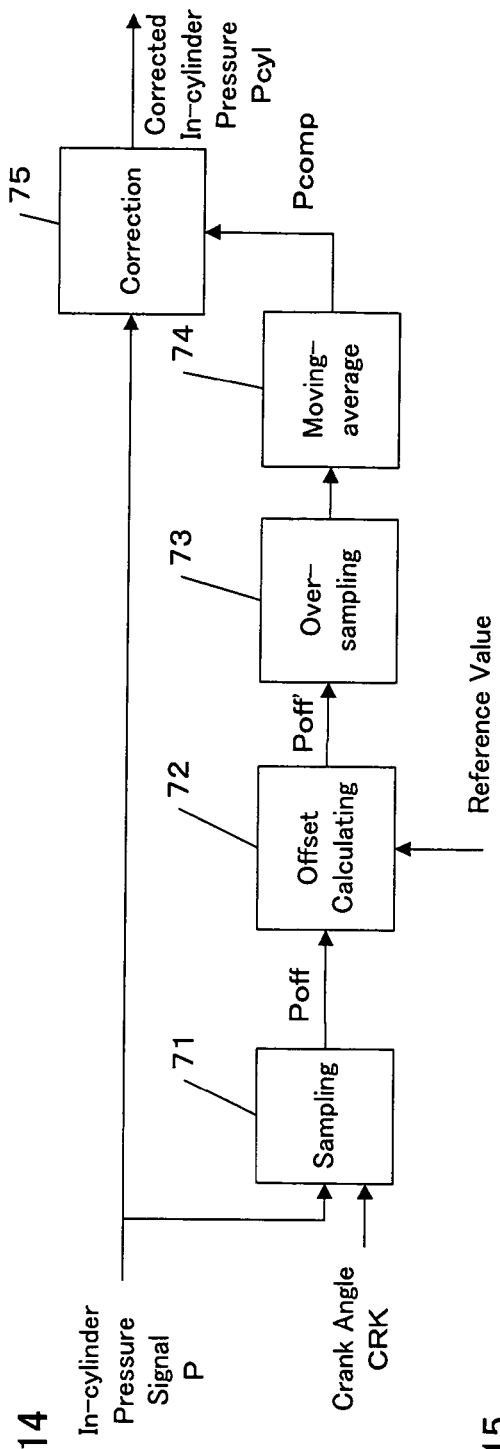
FIG. 14 is a block diagram of an offset removing unit in accordance with a second embodiment of the present invention.

FIG. 14 is a block diagram of an offset removing unit 44 in accordance with a second embodiment. A difference from the offset removing unit of FIG. 11 is in that an offset calculating circuit 72 is provided.

A sampling circuit 71 operates in a similar way to the sampling circuit 61. The sampling circuit 71 samples the output signal P from the integration unit 43 at a predetermined crank angle in each combustion cycle to acquire an offset Poff.

The offset calculating circuit 72 calculates an absolute offset amount Poff' in accordance with the equation (17) every time the offset Poff is acquired by the sampling circuit 71.

absolute offset amount $Poff'$=offset $Poff$−reference value (17)

Preferably, the reference value is the output Pb of the intake manifold pressure sensor 20 (FIG. 1) that is sampled at the same timing as the sampling by the sampling circuit 71. When the intake valve is open in the intake stroke, the in-cylinder pressure and the intake manifold pressure are almost equal. Therefore, the absolute value of the offset amount can be calculated by subtracting the intake manifold pressure Pb from the offset Poff.

An over-sampling circuit 73 oversamples the absolute offset amount Poff' in a similar way to the over-sampling circuit 62 of FIG. 11. A moving average circuit 74 calculates a moving average value Pcomp of the samples obtained by the over-sampling in a similar way to the moving average circuit 63 of FIG. 11. A correction circuit 75 calculates a corrected in-cylinder pressure Pcyl having no offset by subtracting the correction term Pcomp calculated by the moving average circuit 74 from the in-cylinder pressure P calculated by the integration unit 43.

Because the correction term Pcomp is calculated using the absolute value Poff' of the offset, the offset can be more accurately determined. Thus, the accuracy of calculating the corrected in-cylinder pressure Pcyl can be improved. Alternatively, a pressure value that is calculated based on the output of the airflow meter 16 (FIG. 1) may be used as the reference value.

In the above-described first and second embodiments, the moving average method is used to calculate the average of the over-sampled offsets and the over-sampled absolute offset amounts. Alternatively, other filtering means (for example, a low-pass filter) may be used.

Figure 15:
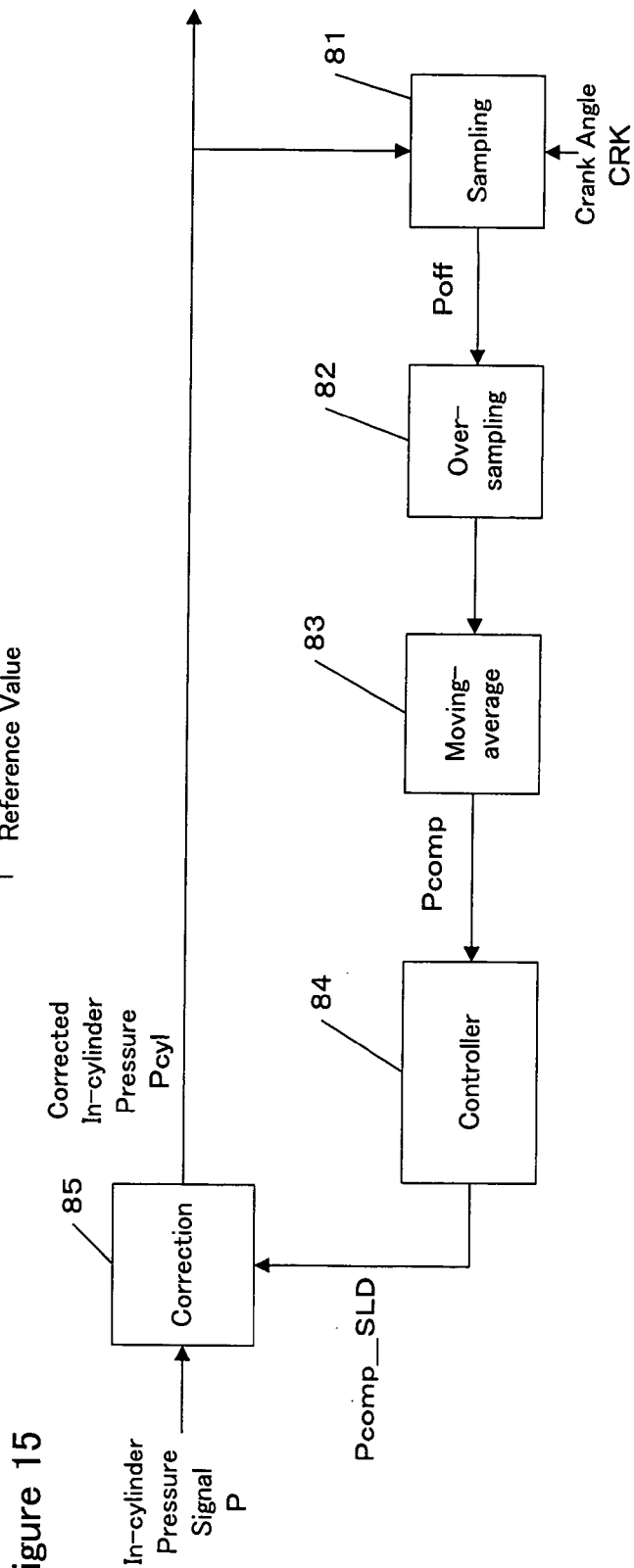
FIG. 15 is a block diagram of an offset removing unit in accordance with a third embodiment of the present invention.

FIG. 15 is a block diagram of an offset removing unit 44 in accordance with a third embodiment. A difference from the offset removing device of FIG. 11 is in that a controller 84 is provided.

A sampling circuit 81 samples the corrected in-cylinder pressure Pcyl at a predetermined crank angle in each combustion cycle in a similar way to the sampling circuit 61 of FIG. 11, and holds the corrected in-cylinder pressure's sample Poff. It should be noted that what is sampled by the sampling circuit 81 is the corrected in-cylinder pressure Pcyl whereas what is sampled by the sampling circuit 61 is the output signal P of the integration unit 43. This is because the controller 84 needs to use, as its input, the corrected in-cylinder pressure signal Pcyl in which a correction term Pcomp_SLD from the controller 84 has been reflected.

An over-sampling circuit 82 oversamples the offset Poff from the sampling circuit 81 in a similar way to the oversampling circuit 62 of FIG. 11. A moving average circuit 83 calculates a moving average value Pcomp of the samples acquired by the over-sampling in a similar way to the moving average circuit 63 of FIG. 11.

The controller 84 performs a feedback control of the moving average value Pcomp calculated by the moving average circuit 83. Specifically, Pcomp_SLD is calculated so that the moving average value Pcomp converges to a desired value Pcomp_cmd. The desired value Pcomp_cmd is zero in this embodiment. Pcomp_SLD is used as a correction term. A correction circuit 85 calculates a corrected in-cylinder pressure Pcyl by adding the correction term Pcomp_SLD to the in-cylinder pressure signal P.

The controller 84 uses a response assignment control as the feedback control. The response assignment control is a control that can specify a convergence speed of a controlled variable (the moving average value Pcomp in this embodiment) to a desired value. According to the response assignment control, the moving average value Pcomp can converge to the desired value without overshooting. In this embodiment, a simplified version of the sliding mode control is used as the response assignment control.

Figure 16:
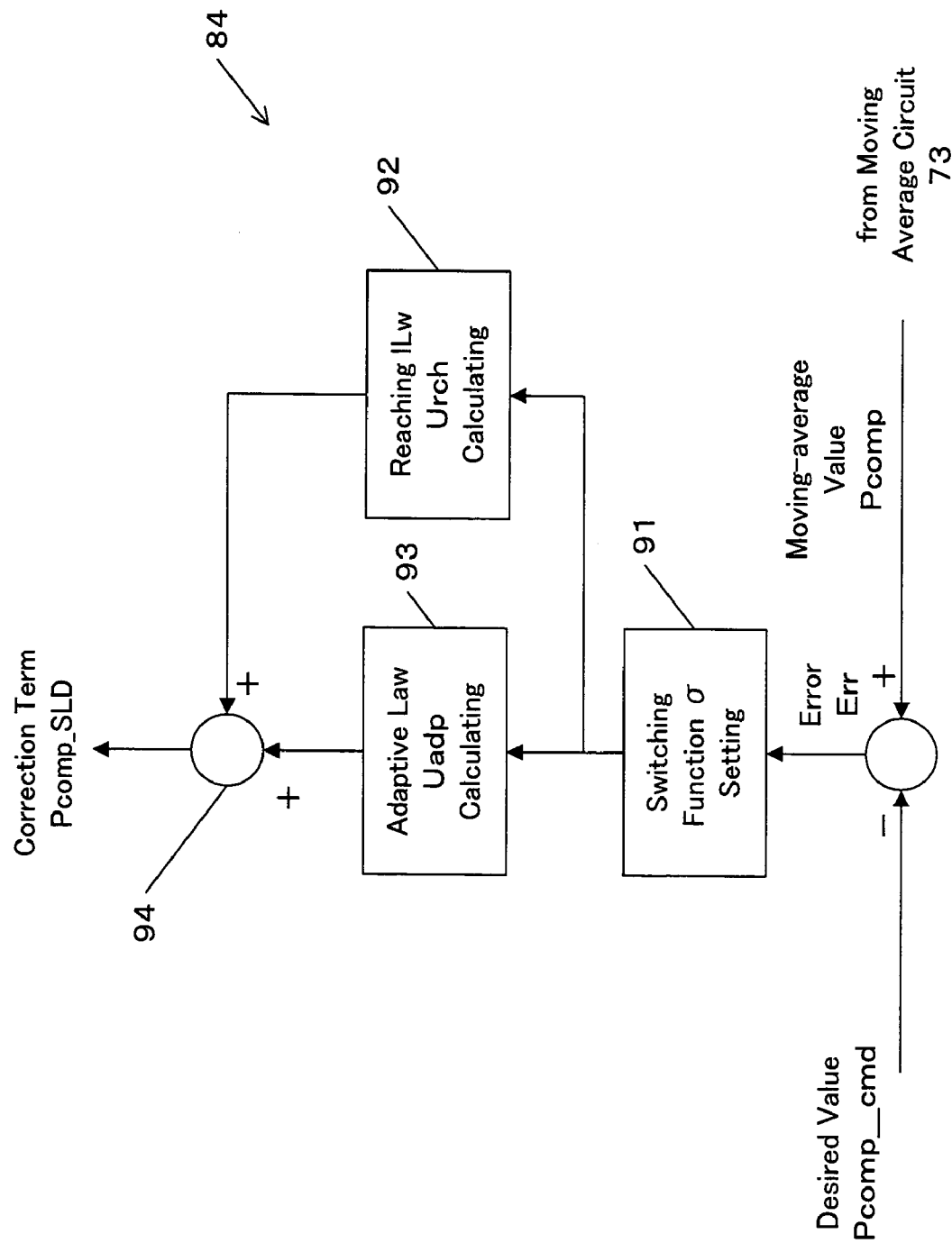
FIG. 16 is a block diagram of a controller in accordance with the third embodiment of the present invention.

FIG. 16 shows more detailed functional blocks of the controller 84. In order to implement the response assignment control, a switching function setting unit 91 sets a switching function σ as shown in the equation (18). Err indicates an error between the moving average value Pcomp(k) and the desired value Pcomp-cmd as shown in the equation (19). k represents an operation cycle.

$$\sigma(k)=Err(k)+POLE \times Err(k-1) \quad (18)$$

$$Err(k)=Pcomp(k)-Pcomp\_cmd \quad (19)$$

POLE is a response assignment parameter of the switching function σ to define the convergence speed of the moving average value Pcomp. Preferably, POLE is set to satisfy −1<POLE<0.

A system in which the switching function σ(k)=0 is called an equivalent input system and specifies convergence characteristics of the moving average value Pcomp. Assuming that σ(k)=0, the equation (19) can be expressed as shown by the equation (20).

$$Err(k)=-POLE \times Err(k-1) \quad (20)$$

Figure 17:
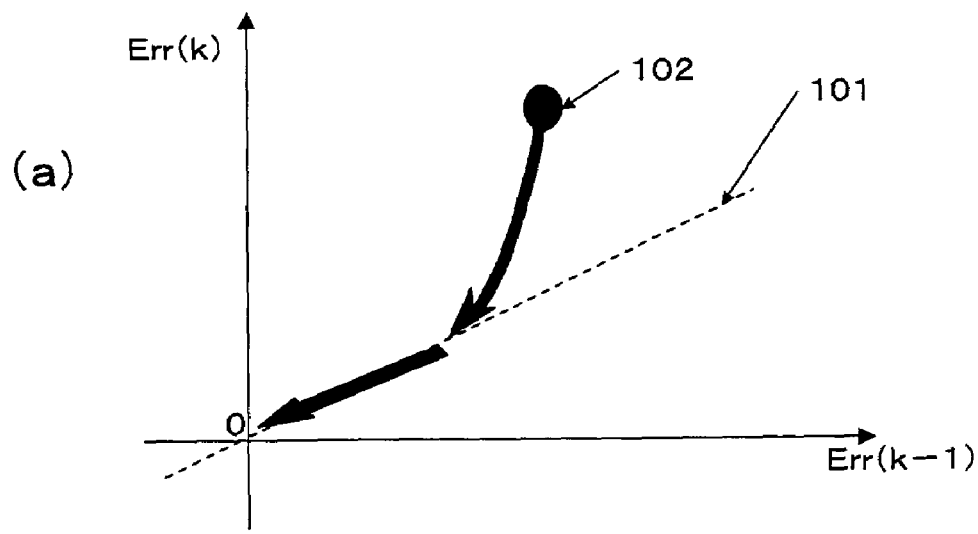
FIG. 17(a) shows a switching function of a response assignment control in accordance with one embodiment of the present invention.
FIG. 17(b) shows a response assignment parameter in accordance with one embodiment of the present invention.
Figure 17:
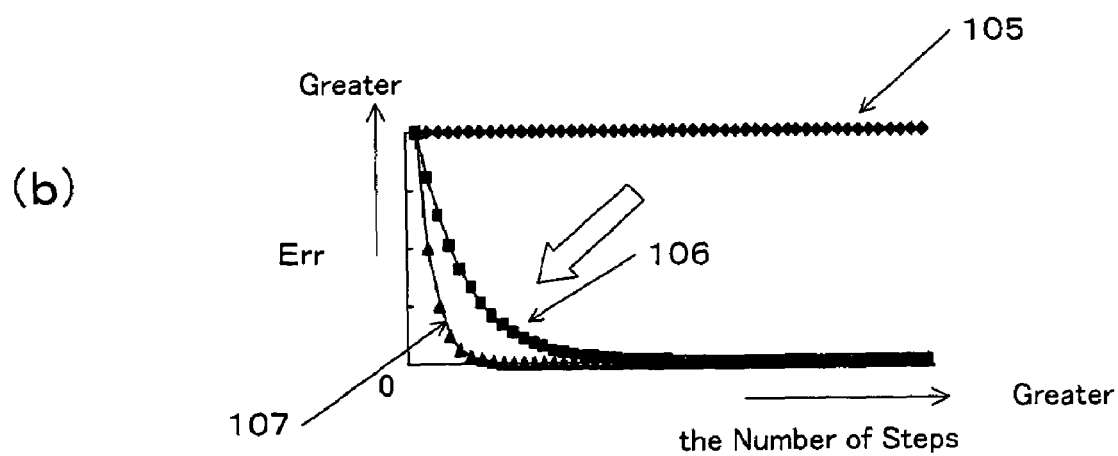

The switching function will be described referring to FIG. 17. The equation (20) is shown by a line 101 in a phase plane with Err(k) on the vertical axis and Err(k−1) on the horizontal axis. This line 101 is referred to as a switching line. Assuming that a point 102 indicates an initial value of a state quantity (Err(k−1), Err(k)), which is a combination of Err (k−1) and Err(k), the response assignment control places the state quantity shown by the point 102 on the switching line 101 and then constrains it on the switching line 101.

According to the response assignment control, since the state quantity 102 is held on the switching line 101, the state quantity can stably converge to the origin 0 of the phase plane without being influenced by disturbance or the like. In other words, by constraining the state quantity (Err(k−1), Err(k)) within such a stable system having no input as shown by the equation (20), the error Err can converge to zero robustly against disturbance.

Because the phase plane regarding the switching function σ has two dimensions in this embodiment, the switching line is represented by a straight line 101. When the phase plane has three dimensions, the switching line is represented by a plane. When the phase plane has four or more dimensions, the switching line is represented by a hyperplane.

The response assignment parameter POLE can be variably set. The convergence speed of the error Err can be specified by adjusting the response assignment parameter POLE.

Referring to FIG. 17(b), reference numerals 105, 106 and 107 show the convergence speed of the error Err when the response assignment parameter POLE takes a value of −1, −0.8 or −0.5, respectively. The convergence speed of the error Err increases as the absolute value of the response assignment parameter POLE decreases.

Referring back to FIG. 16, a reaching law calculating unit 92 calculates a reaching law input Urch which is represented by a proportion term of the switching function a as shown by the equation (21). The reaching law input Urch is an input for placing the state quantity on the switching line. An adaptive law calculating unit 93 calculates an adaptive law input Uadp which is represented by an integral term of the switching function σ as shown in the equation (22). The adaptive law input Uadp is an input for constraining the state quantity on the switching line while suppressing a steady-state error. Krch and Kadp are feedback gains that are to be predetermined by simulation or the like. An adder 94 adds the reaching law input Urch and the adaptive law input Uadp as shown in the equation (23). Thus, the correction term Pcomp_SLD is determined.

$$Urch(k)=-Krch\cdot\sigma(k) \quad (21)$$

$$Uadp(k) = -Kadp\cdot\sum_{i=0}^{k} \sigma(i) \quad (22)$$

$$Pcomp\_SLD(k)=Urch(k)+Uadp(k) \quad (23)$$

As shown in FIG. 15, the correction term Pcomp_SLD(k) is fed back to the correction circuit 85. The correction circuit 85 adds the received correction term Pcomp_SLD(k) to the in-cylinder pressure signal P(k+1) that is obtained in the next cycle to calculate the corrected in-cylinder pressure Pcyl(k+1). Based on the corrected in-cylinder pressure Pcyl (k+1), the correction term Pcomp_SLD(k+1) is calculated again and fed back to the correction circuit 85.

Figure 18:
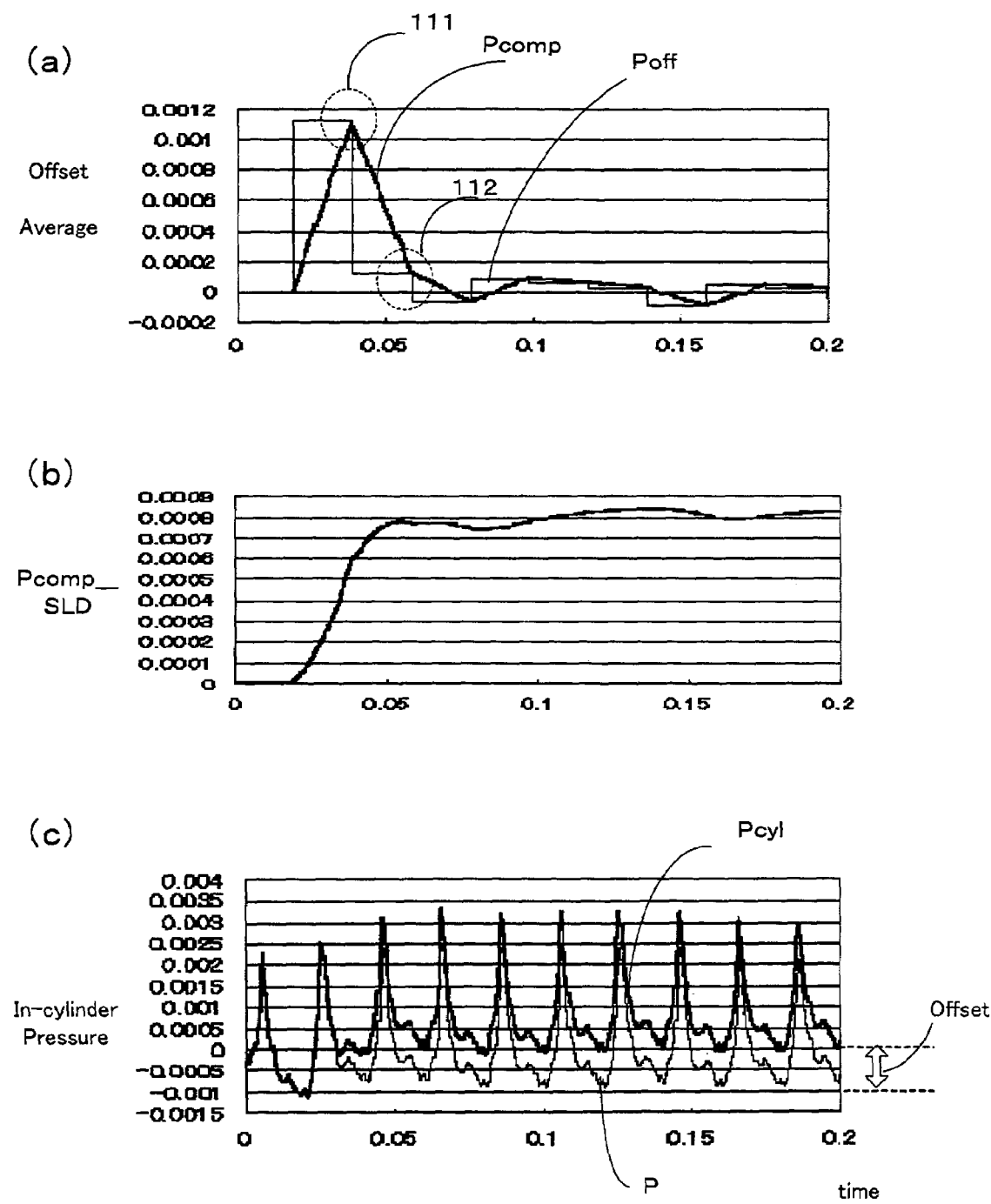
FIG. 18 shows an effect of using a response assignment control in accordance with one embodiment of the present invention.

Referring to FIG. 18, an effect of using a response assignment control will be described. FIG. 18(a) shows a waveform of the offset Poff generated by the sampling circuit 81 and a waveform of the moving average value Pcomp calculated by the moving average circuit 83. In the moving average value Pcomp, discontinuities appear between combustion cycles as indicated by reference numerals 111 and 112. This is caused by the fact that the offset Poff is determined every combustion cycle. In other words, this is caused by the fact that the offset Poff is constant during one combustion cycle. If the moving average value Pcomp having such discontinuities is used as a correction term for correcting the in-cylinder pressure P, discontinuities may appear in the waveform of the corrected in-cylinder pressure Pcyl. This is not desirable, for example, in a subsequent process for resolving the frequency of the corrected in-cylinder pressure. Such discontinuities can be eliminated by using the response assignment control.

FIG. 18(b) shows the correction term Pcomp_SLD calculated by the controller 84. Because the correction term Pcomp_SLD is determined by the response assignment control so that the moving average value Pcomp gradually reaches a desired value, the waveform of the correction term Pcomp_SLD is continuous. Because the correction term Pcomp_SLD has no discontinuities, undesired discontinuities can be prevented from appearing in the waveform of the corrected in-cylinder pressure Pcyl.

FIG. 18(c) shows the in-cylinder pressure Pcyl that has been corrected with the correction term Pcomp_SLD. As can be seen in the comparison with the in-cylinder pressure signal P, the corrected in-cylinder pressure Pcyl has no offset.

Figure 19:
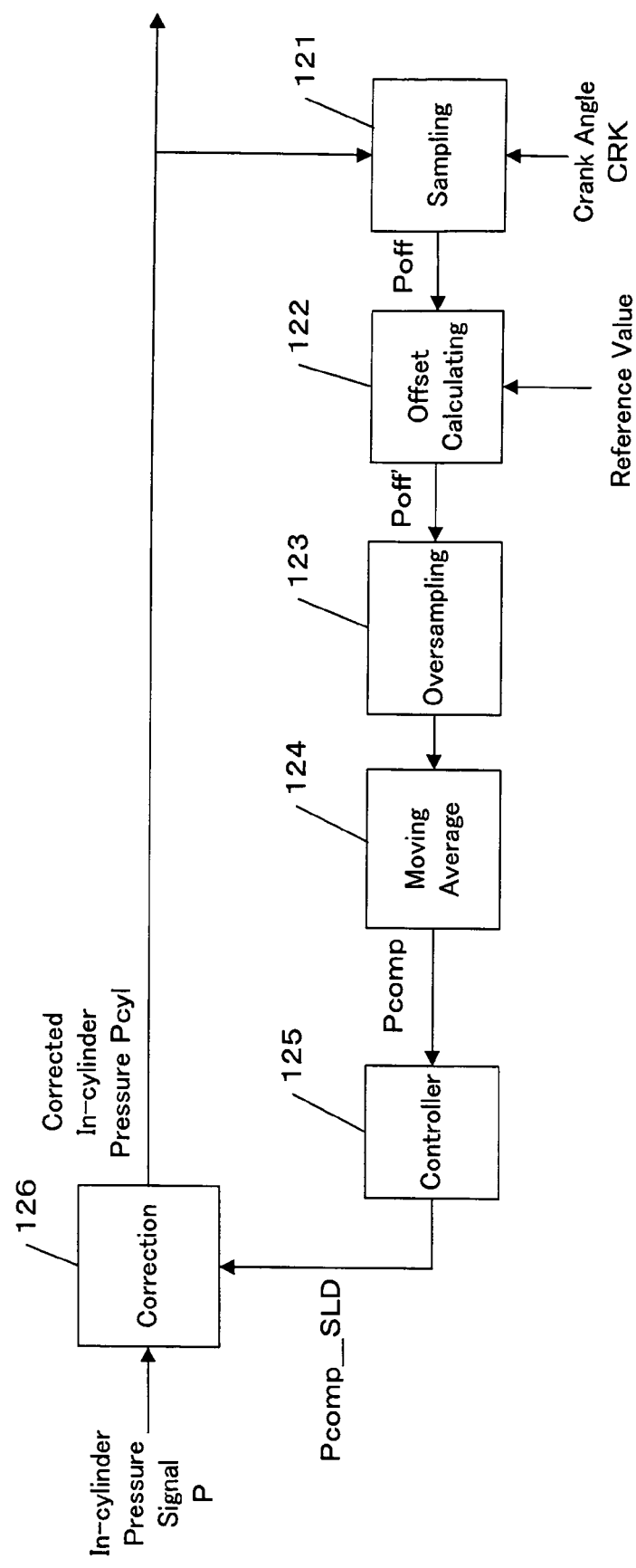
FIG. 19 is a block diagram of an offset removing unit in accordance with a fourth embodiment of the present invention.

FIG. 19 is a block diagram of an offset removing unit 44 in accordance with a fourth embodiment. A difference from the offset removing unit of FIG. 15 is in that an offset calculating unit 122 is provided.

A sampling circuit 121 operates in a similar way to the sampling circuit 81 of FIG. 15. The sampling circuit 121 samples the corrected in-cylinder pressure Pcyl at a predetermined crank angle in each combustion cycle to acquire an offset Poff.

The offset calculating circuit 122 calculates an absolute offset amount Poff' in accordance with the equation (24) every time the offset Poff is acquired by the sampling circuit 121.

absolute offset amount Poff'=offset Poff−reference value (24)

As described above, the reference value is preferably the output Pb of the intake manifold pressure sensor 20 (FIG. 1) which is sampled in the same timing as the sampling by the sampling circuit 121.

An oversampling circuit 123 oversamples the absolute offset amount Poff' in a similar way to the over-sampling circuit 82 of FIG. 15. A moving average circuit 124 calculates a moving average value of the samples acquired by the over-sampling in a similar way to the moving average circuit 83. A controller 125 calculates a correction term Pcomp_SLD for causing the moving average value Pcomp to converge to a desired value Pcomp_cmd in a similar way to the controller 84. In this embodiment, the intake manifold pressure Pb sampled in the intake stroke is set in the desired value Pcomp_cmd. A correction circuit 126 adds the correction term Pcomp_SLD calculated by the controller 125 to the in-cylinder pressure P from the integration unit 43 to determine the corrected in-cylinder pressure Pcyl having no offset.

Referring to FIG. 20 through FIG. 25, a process for calculating the corrected in-cylinder pressure Pcyl in accordance with one embodiment of the present invention will be described. This process can be typically implemented by the functional blocks shown in FIG. 7(a). A process for removing the offset is based on the process performed by the offset removing unit in accordance with the fourth embodiment. However, those skilled in the art would recognize that this process can be modified to be applicable to the offset removing unit in accordance with the first, second or third embodiment.

Figure 20:
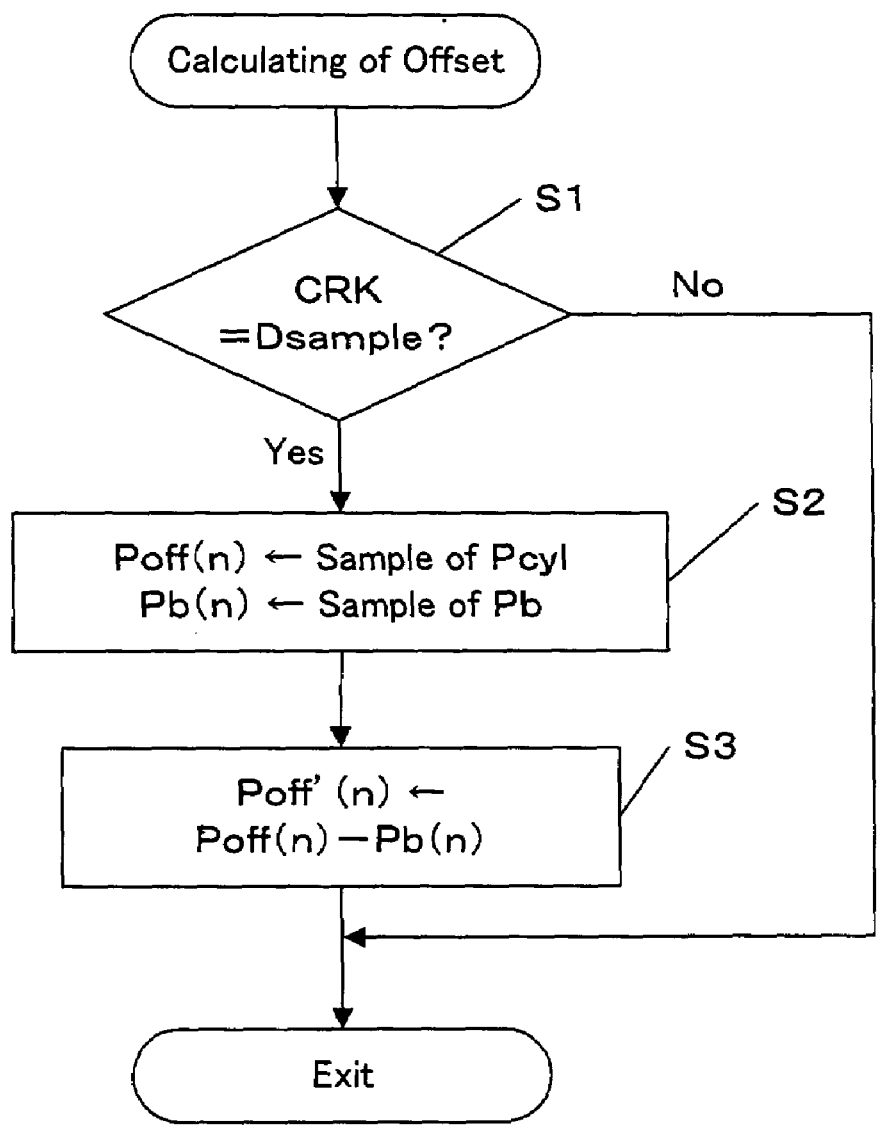
FIG. 20 is a flowchart of a process for calculating an absolute offset Poff' in accordance with one embodiment of the present invention.

FIG. 20 shows a process for acquiring a sample of the offset Poff. This process is performed at a predetermined crank angle interval in each combustion cycle. In step S1, it is determined whether the crank angle CRK detected by the crank angle sensor 17 has reached a predetermined value Dsample. In step S2, if the crank angle CRK has reached the predetermined value Dsample, the corrected in-cylinder pressure Pcyl is sampled. The sample is set in Poff(n) as an offset. Furthermore, the detection value Pb from the intake manifold pressure sensor is acquired. In step S3, the intake manifold pressure Pb(n) is subtracted from the offset Poff(n) to determine the absolute offset amount Poff'(n).

Figure 21:
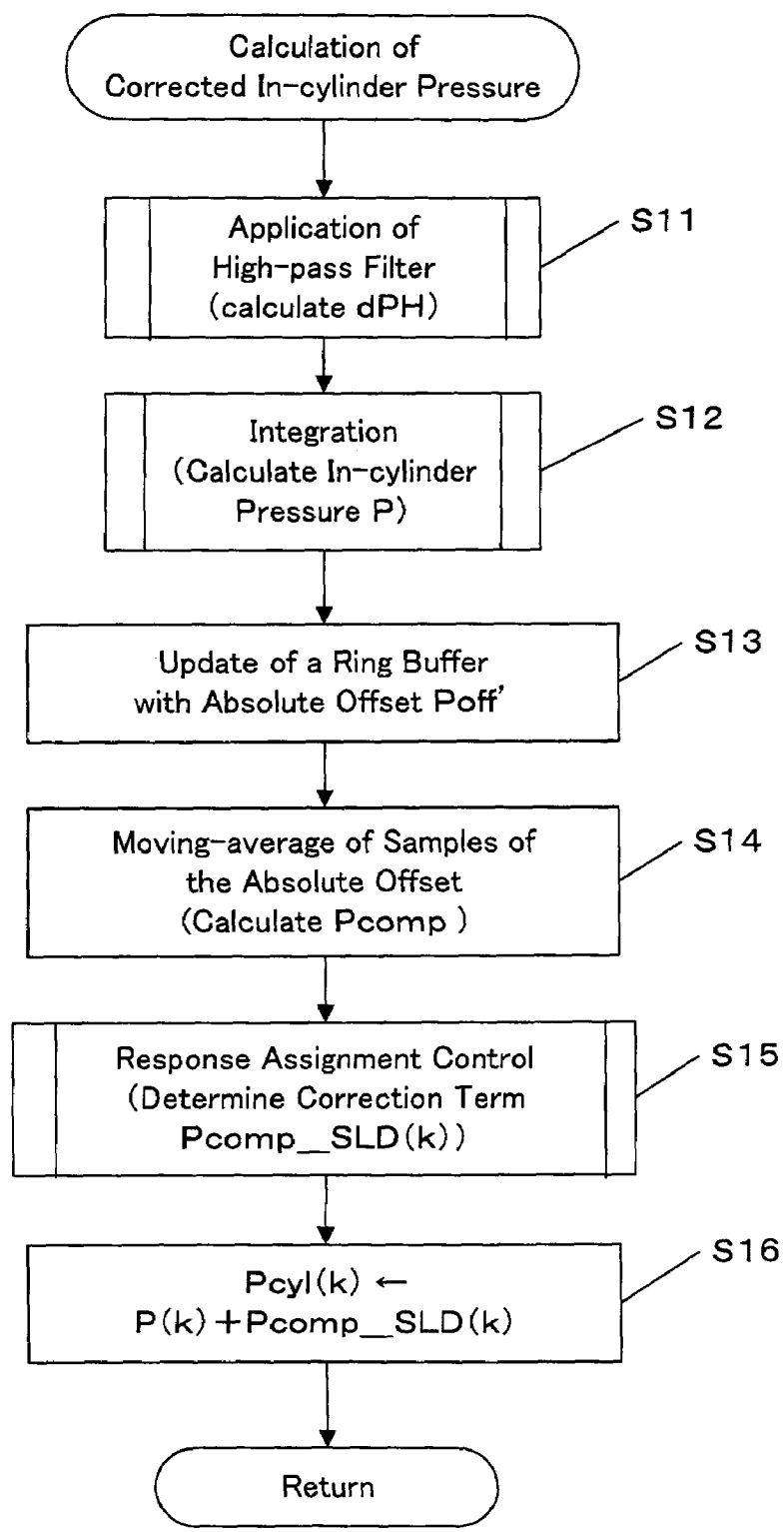
FIG. 21 is a flowchart of a process for calculating a corrected in-cylinder pressure Pcyl in accordance with one embodiment of the present invention.

FIG. 21 shows a main routine of a process for calculating the corrected in-cylinder pressure Pcyl. This process is performed at the frequency Fs that is used when the output of the in-cylinder pressure sensor is sampled.

In step S11, a process (FIG. 22) for applying a high-pass filter to the output signal dP of the in-cylinder pressure sensor is performed. In step S12, a process (FIG. 23) for integrating the output dPH of the high-pass filter is performed to determine the in-cylinder pressure P.

In step S13, a ring buffer is updated with the absolute offset amount Poff' determined in step S3 of FIG. 20 as described referring to the above equation (15). Because the process of FIG. 21 is performed at the sampling frequency Fs, the step S13 results in the oversampling of the absolute offset amount. That is, the sampling period for the absolute offset amount is shorter than the sampling period for the corrected in-cylinder pressure.

In step S14, the moving average value Pcomp is calculated in accordance with the above equation (16). In step S15, a response assignment control (FIG. 24) is performed to determine the correction term Pcomp_SLD, In step S16, the correction term Pcomp_SLD is added to the in-cylinder pressure P calculated in step S12 to determine the corrected in-cylinder pressure Pcyl.

Figure 22:
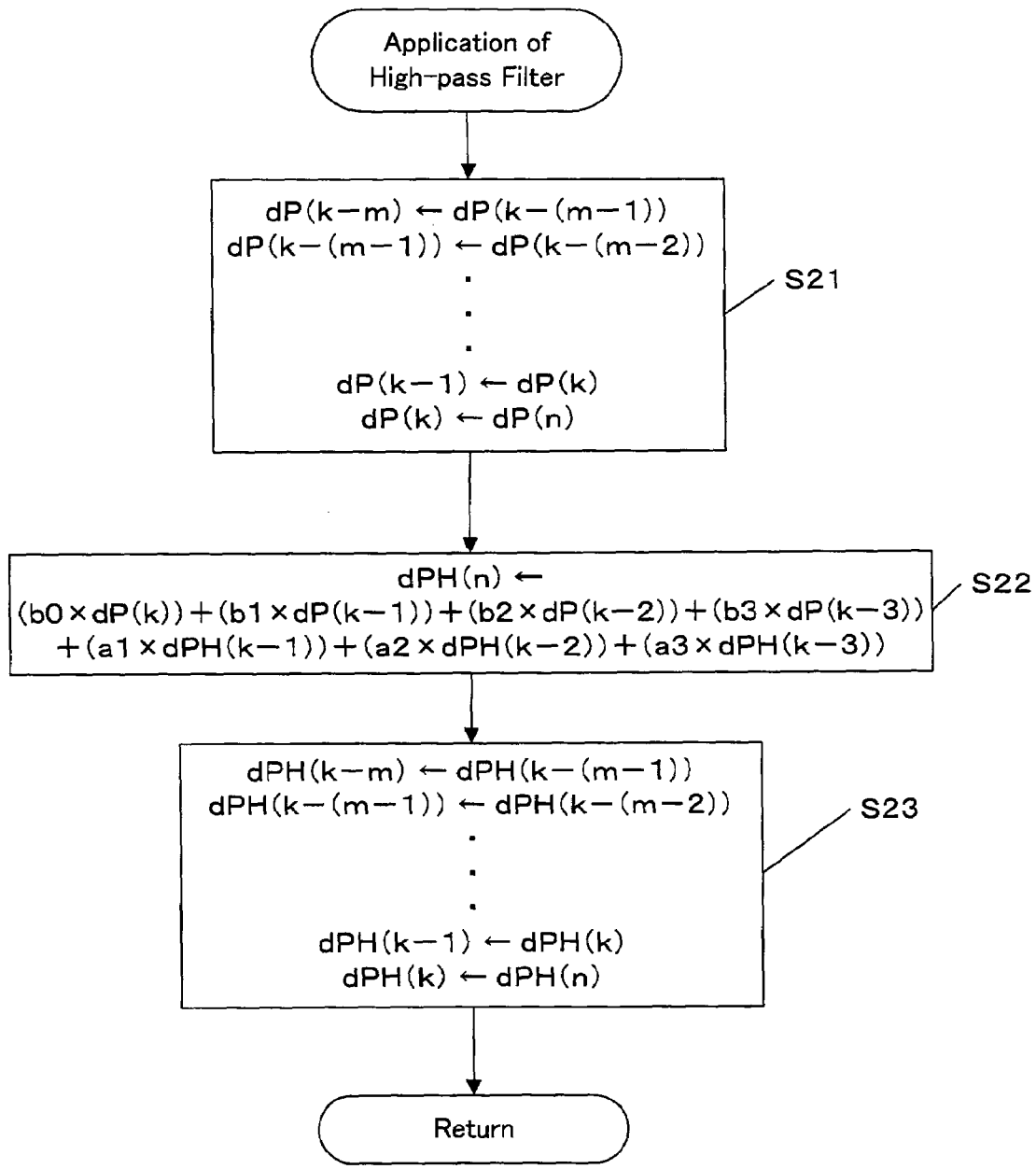
FIG. 22 is a flowchart of a process for applying a high-pass filter in accordance with one embodiment of the present invention.

FIG. 22 shows a process for applying a high-pass filter performed in step S11. In this embodiment, a third-order high-pass filter is used. In step S21, a ring buffer for the input of the high-pass filter is updated. Specifically, in order to store in the buffer dP(k) the current value dP(n) of the output of the in-cylinder pressure sensor, the value of the buffer dP(k−(m−1)) is moved to the buffer dP(k−m), the value of the buffer dP(k−(m−2)) is moved to the buffer dP(k−(m−1)), . . . , and the value of the buffer dP(k) is moved to the buffer dP(k−1).

In step S22, filtering is performed in accordance with the equation (25) to determine the output dPH.

$$dPH(n) = \\ b0 \times dP(k) + b1 \times dP(k-1) + b2 \times dP(k-2) + b3 \times dP(k-3) + \\ a1 \times dPH(k-1) + a2 \times dPH(k-2) + a3 \times dPH(k-3) \tag{25}$$

a1, a2 and a3 are feedback terms and b0, b1, b2 and b3 are feed-forward terms. These values are determined depending on the filter characteristics as described above referring to the equation (8).

In step S23, a ring buffer for the output of the high-pass filter is updated. This update is required because the past values of the output of the high-pass filter are used to calculate the output dPH of the high-pass filter as shown in the equation (25). The update of the ring buffer is performed in a similar way to step S21.

Figure 23:
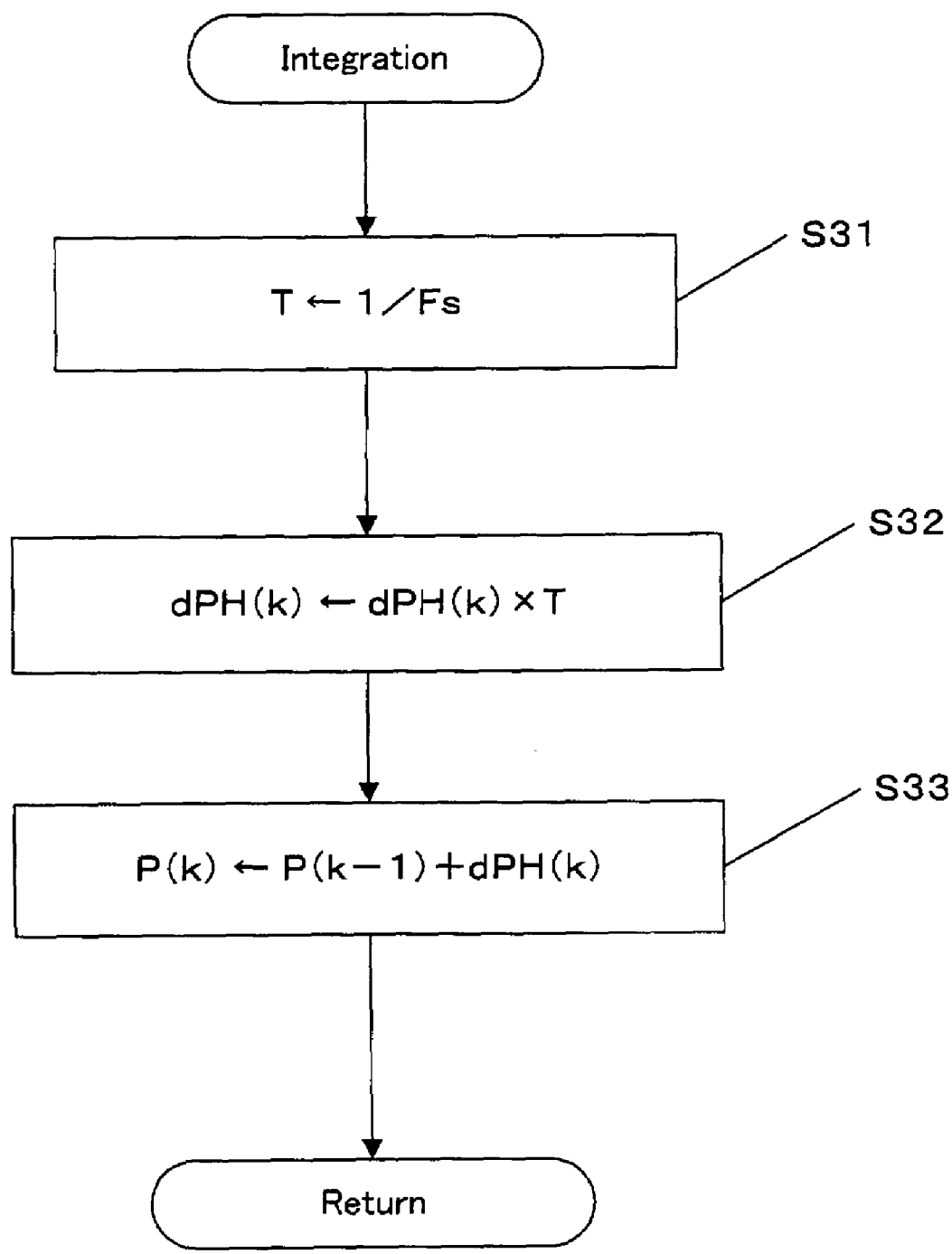
FIG. 23 is a flowchart of a process for integrating the output of a high-pass filter in accordance with one embodiment of the present invention.

FIG. 23 shows a process for integrating the output dPH of the high-pass filter. In step S31, the sampling period T is determined based on the sampling frequency Fs as shown by the equation (26).

$$T = 1/Fs \tag{26}$$

In steps S32 and S33, the integral value P of the in-cylinder pressure is calculated. Specifically, in step S32, the output dPH(k) of the high-pass filter is multiplied by the sampling period T (seconds). In step S33, the output value dPH(k) of the high-pass filter per sampling interval T seconds is added to the previous value P(k−1) of the in-cylinder pressure to determine the current value P(k) of the in-cylinder pressure.

Figure 24:
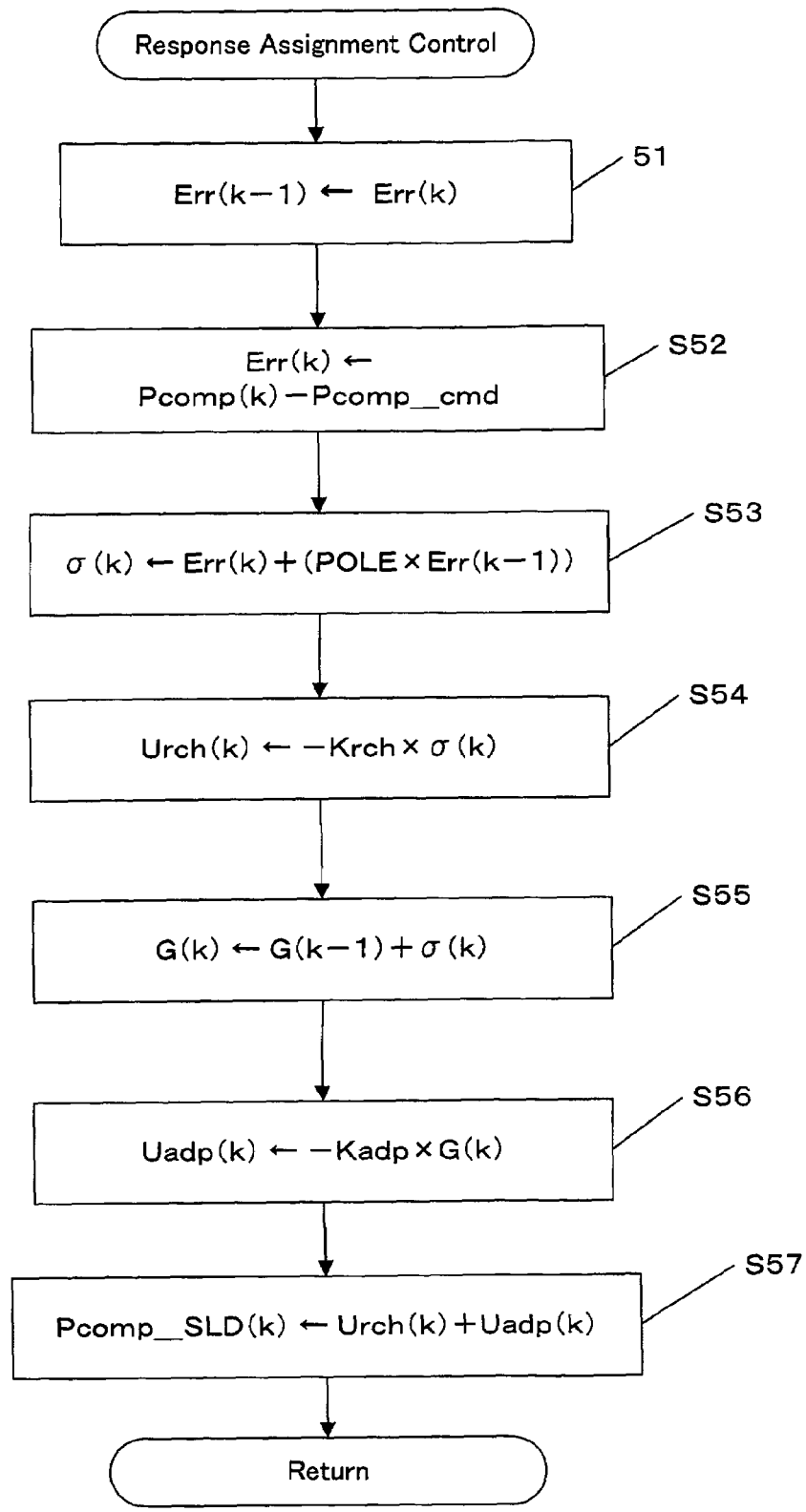
FIG. 24 is a flowchart of a process for a response assignment control in accordance with one embodiment of the present invention.
Figure 25:
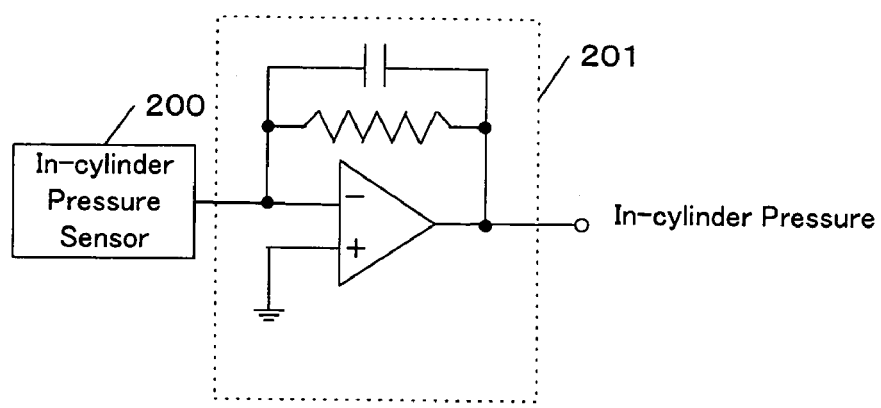
FIG. 25 is a block diagram of a circuit for integrating the output of an in-cylinder pressure sensor in accordance with a conventional technique.
Figure 26:
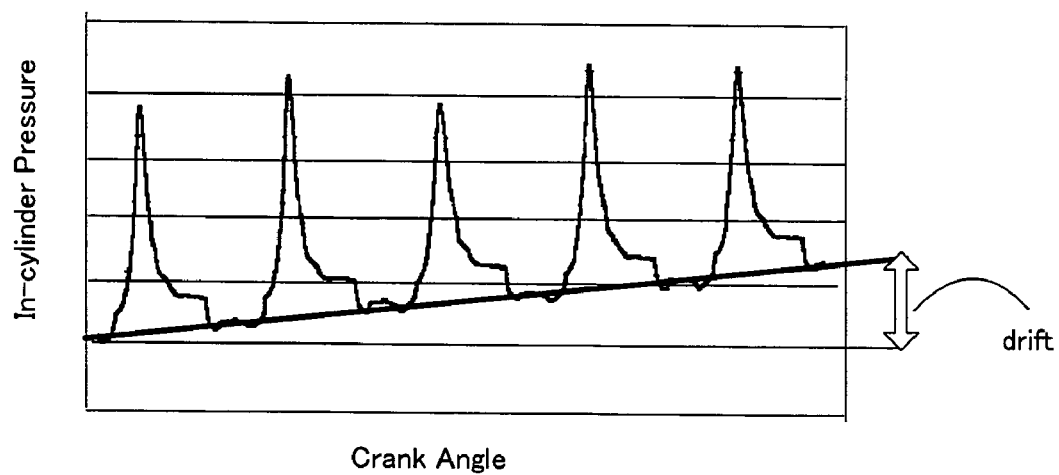
FIG. 26 schematically shows a drift.
Figure 27:
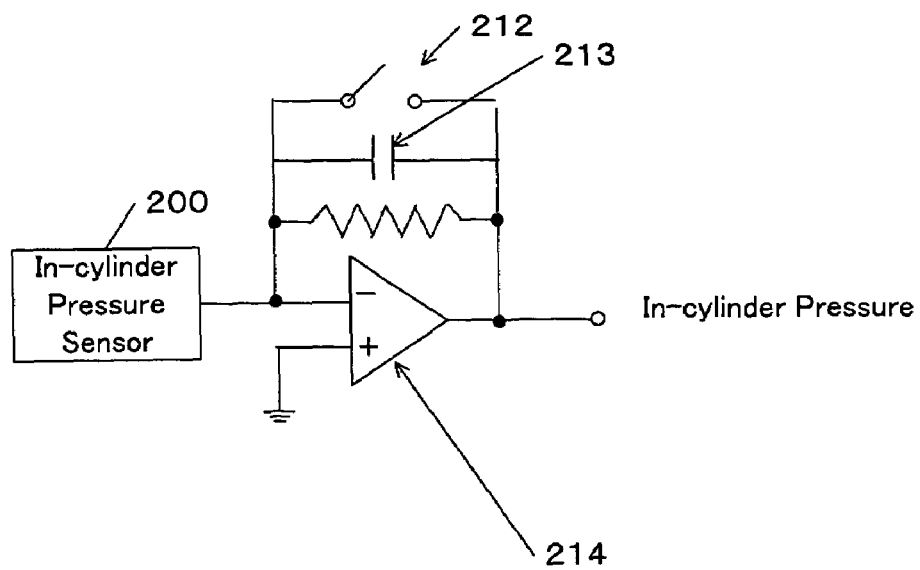
FIG. 27 is a block diagram of a circuit with a resetting means for integrating the output of an in-cylinder pressure sensor in accordance with a conventional technique.
Figure 28:
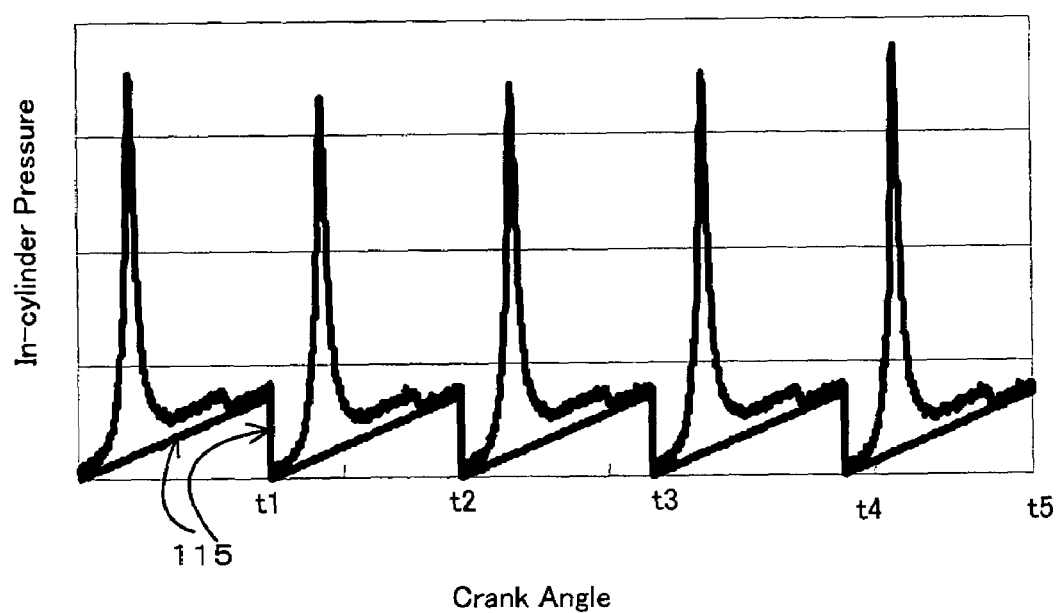
FIG. 28 shows an influence of resetting operation upon an in-cylinder pressure in accordance with a conventional technique.

FIG. 24 shows a process for determining the correction term Pcomp_SLD through the response assignment control.

In step S51, the current value Err(k) of the error is stored as a previous value Err(k−1). In step S52, the error Err(k) between the moving average value Pcomp(k) calculated in step S14 of FIG. 21 and a desired value Pcomp_cmd is calculated in accordance with the above equation (19).

In step S53, the switching function $\sigma$ is calculated in accordance with the above equation (18). In step S54, the reaching law input Urch is calculated in accordance with the above equation (21). In step S55, the switching function $\sigma(k)$ is added to the previous value G(k−1) to determine the current value G(k). Here, G is an accumulated value of the switching function. In step S56, the adaptive law input Uadp is calculated in accordance with the above equation (22). In step S57, the correction term Pcomp_SLD is calculated in accordance with the above equation (23).

Alternatively, the correction term Pcomp_SLD may be calculated by using another control other than the response assignment control, such as a back-stepping control or an optimal control.

The present invention can be applied to a general-purpose engine (for example, an outboard motor).

What is claimed is:

1. An apparatus for detecting an internal cylinder pressure of an engine, comprising:
   an in-cylinder pressure sensor for outputting a signal corresponding to a change rate of an internal cylinder pressure of an engine;
   a filter for filtering the output signal from the in-cylinder pressure sensor, the filter cutting frequency components lower than frequencies that substantially compose an internal cylinder pressure required for controlling the engine; and
   an integrator for integrating the filtered signal to determine the internal cylinder pressure.

2. The apparatus of claim 1, wherein the filter is configured to cut frequency components composing a drift as well as being lower than frequencies that substantially compose an internal cylinder pressure required for controlling the engine.

3. The apparatus of claim 1, wherein the filter changes a cut-off frequency in accordance with a detected rotational speed of the engine.

4. The apparatus of claim 1, further comprising a sampler for sampling the output signal of the in-cylinder pressure sensor in synchronization with rotation of the engine,
wherein the filter filters the sampled output signal.

5. The apparatus of claim 1, further comprising a unit for removing an offset of the internal cylinder pressure.

6. The apparatus of claim 5, wherein the unit for removing an offset of the internal cylinder pressure is configured to:
sample as an offset the internal cylinder pressure from the integrator at a first sampling period;
over-sample the offset at a second sampling period shorter than the first sampling period;
moving-average the over-sampled offsets to determine a moving average value; and
remove the offset by subtracting the moving average value from the internal cylinder pressure.

7. The apparatus of claim 5, wherein the unit for removing an offset from the internal cylinder pressure is configured to:
sample as an offset the internal cylinder pressure from the integrator at a first sampling period;
subtract a reference value from the offset to determine an absolute offset;
over-sample the absolute offset at a second sampling period shorter than the first sampling period;
moving-average the over-sampled absolute offsets to determine a moving average value; and
remove the offset by subtracting the moving average value from the internal cylinder pressure.

8. The apparatus of claim 7, wherein the reference value is a pressure of an intake manifold in the intake stroke of a combustion cycle of the engine.

9. The apparatus of claim 5, wherein the unit for removing an offset from the internal cylinder pressure comprises:
means for correcting the internal cylinder pressure with a correction term; and
means for determining the correction term based on the corrected internal cylinder pressure to feed back the correction term to the means for correcting;
wherein the means for determining is configured to:
sample as an offset the corrected internal cylinder pressure at a first sampling period;
over-sample the offset at a second sampling period shorter than the first sampling period;
moving-average the over-sampled offsets to determine a moving average value; and
determine the correction term for causing the moving-average value to converge to a desired value.

10. The apparatus of claim 5, wherein the unit for removing an offset from the internal cylinder pressure comprises:
means for correcting the internal cylinder pressure with a correction term; and
means for determining the correction term based on the corrected internal cylinder pressure to feed back the correction term to the means for correcting;
wherein the means for determining is configured to:
sample as an offset the corrected internal cylinder pressure at a first sampling period;
subtract a reference value from the offset to determine an absolute offset;
over-sample the absolute offset at a second sampling period shorter than the first sampling period;
moving-average the over-sampled absolute offsets to determine a moving average value; and
determine the correction term for causing the moving-average value to converge to a desired value.

11. A method for detecting an internal cylinder pressure of an engine, comprising:
acquiring an output signal of an in-cylinder pressure sensor of an engine, the output signal indicating a change rate of the internal cylinder pressure;
filtering the output signal, the filtering includes cutting frequency components lower than frequencies that substantially compose an internal cylinder pressure required for controlling the engine; and
integrating the filtered signal to determine the internal cylinder pressure.

12. The method of claim 11, wherein the filtering includes cutting frequency components composing a drift as well as being lower than frequencies that substantially compose an internal cylinder pressure required for controlling the engine.

13. The method of claim 11, further comprising changing a cut-off frequency for the filtering in accordance with a detected rotational speed of the engine.

14. The method of claim 11, further comprising sampling the output signal in synchronization with rotation of the engine,
wherein the filtering filters the sampled output signal.

15. The method of claim 11, further comprising removing an offset of the internal cylinder pressure.

16. The method of claim 15, wherein the removing further includes:
sampling as an offset the internal cylinder pressure determined by the integration at a first sampling period;
over-sampling the offset at a second sampling period shorter than the first sampling period;
moving-averaging the over-sampled offsets to determine a moving average value; and
removing the offset by subtracting the moving average value from the internal cylinder pressure.

17. The method of claim 15, wherein the removing further includes:
sampling as an offset the internal cylinder pressure determined by the integration at a first sampling period;
subtracting a reference value from the offset to determine an absolute offset;
over-sampling the absolute offset at a second sampling period shorter than the first sampling period;
moving-averaging the over-sampled absolute offsets to determine a moving average value; and
removing the offset by subtracting the moving average value from the internal cylinder pressure.

18. The method of claim 17, wherein the reference value is a pressure of an intake manifold in the intake stroke of a combustion cycle of the engine.

19. The method of claim 15, wherein the removing further includes:
correcting the internal cylinder pressure with a correction term;
determining the correction term based on the corrected internal cylinder pressure; and
feed-backing the correction term to the step of correcting;
wherein the step of determining further includes:
sampling the corrected internal cylinder pressure as an offset at a first sampling period;
over-sampling the offset at a second sampling period shorter than the first sampling period;
moving-averaging the over-sampled offsets to determine a moving average value; and determining the correction term for causing the moving-average value to converge to a desired value.

20. The method of claim 15, wherein the removing further includes:

correcting the internal cylinder pressure with a correction term;

determining the correction term based on the corrected internal cylinder pressure; and feed backing the correction term to the step of correcting, wherein the step of determining further includes:

sampling the corrected internal cylinder pressure as an offset at a first sampling period;

subtracting a reference value from the offset to determine an absolute offset;

over-sampling the absolute offset at a second sampling period shorter than the first sampling period;

moving-averaging the over-sampled absolute offsets to determine a moving average value; and determining the correction term for causing the moving-average value to converge to a desired value.

* * * * *